US010860620B1

(12) United States Patent
Martel

(10) Patent No.: US 10,860,620 B1
(45) Date of Patent: Dec. 8, 2020

(54) ASSOCIATING PHYSICAL ITEMS WITH CONTENT

(71) Applicant: David Martel, Sherman Oaks, CA (US)

(72) Inventor: David Martel, Sherman Oaks, CA (US)

( * ) Notice: Subject to any disclaimer, the term of this patent is extended or adjusted under 35 U.S.C. 154(b) by 677 days.

(21) Appl. No.: 15/093,069

(22) Filed: Apr. 7, 2016

Related U.S. Application Data

(60) Provisional application No. 62/144,189, filed on Apr. 7, 2015.

(51) Int. Cl.
G06F 7/00 (2006.01)
G06F 16/28 (2019.01)
G06F 16/26 (2019.01)

(52) U.S. Cl.
CPC ............ G06F 16/287 (2019.01); G06F 16/26 (2019.01)

(58) Field of Classification Search
CPC ......... G06F 17/30572; G06F 17/30601; G06F 16/287; G06F 16/26
USPC ........................................ 707/738, 723, 767
See application file for complete search history.

(56) References Cited

U.S. PATENT DOCUMENTS

| 7,578,441 | B2 | 8/2009 | Gower et al. | |
| 7,590,310 | B2 * | 9/2009 | Retterath | G06F 17/30256 382/190 |
| 8,131,118 | B1 * | 3/2012 | Jing | G06F 17/30247 382/305 |
| 8,547,431 | B2 * | 10/2013 | Williams | G06F 17/30247 348/135 |
| 9,607,113 | B1 * | 3/2017 | Ciolfi | G06F 3/04815 |
| 2005/0200912 | A1 * | 9/2005 | Yamakado | G06T 11/60 358/450 |
| 2006/0122915 | A1 * | 6/2006 | Allen | G06Q 30/0601 705/26.1 |
| 2010/0325154 | A1 * | 12/2010 | Schloter | G06F 17/30265 707/770 |
| 2011/0212717 | A1 * | 9/2011 | Rhoads | G06F 17/30241 455/420 |
| 2012/0135745 | A1 * | 5/2012 | Kaplan | G06F 17/30241 455/456.1 |
| 2013/0293583 | A1 * | 11/2013 | Kashitani | G06F 3/0482 345/633 |
| 2014/0056433 | A1 * | 2/2014 | Emerson, III | G06F 17/30743 381/56 |
| 2015/0061974 | A1 * | 3/2015 | Kobayashi | G06F 3/0482 345/8 |
| 2015/0186953 | A1 * | 7/2015 | Gross | G06F 17/30256 705/14.58 |

(Continued)

OTHER PUBLICATIONS

Frohlick, D. et al. *The Memory Box*. Printing Imaging Technologies Laboratory, HP Laboratories Bristol, Hewlett Packard. Published Aug. 9, 2000. 5 pages.

(Continued)

*Primary Examiner* — Md I Uddin
(74) *Attorney, Agent, or Firm* — Fish & Richardson P.C.

(57) ABSTRACT

The present disclosure is directed towards providing content that corresponds to physical items. In some implementations, the present disclosure includes storing multiple sets of content that each correspond to a different context and physical item in a set of physical items, receiving data that identifies a particular physical item, selecting a particular set of content that corresponds to the particular physical item, and causing the particular set of content to be output.

20 Claims, 16 Drawing Sheets

(56) References Cited

U.S. PATENT DOCUMENTS

2015/0294012 A1* 10/2015 DeLuca .................. G06F 16/26
707/722
2016/0110383 A1* 4/2016 Mowry ............. G06F 17/30247
707/758

OTHER PUBLICATIONS

Nunes, M. et al. *Sharing Digital Photographs in the Home through Physical Mementos, Souvenirs, and Keepsakes*. Proceeding DIS '08 Proceedings of the 7th ACM Conference on Designing Interactive Systems. Published Feb. 2008. 10 pages.

Nunes, M. et al. *Using Physical Memorabilia as Opportunities to Move Into Collocated Digital Photo-Sharing*. International Journal of Human-Computer Studies, vol. 67, Issue 12,. Published Dec. 2009. 26 pages.

\* cited by examiner

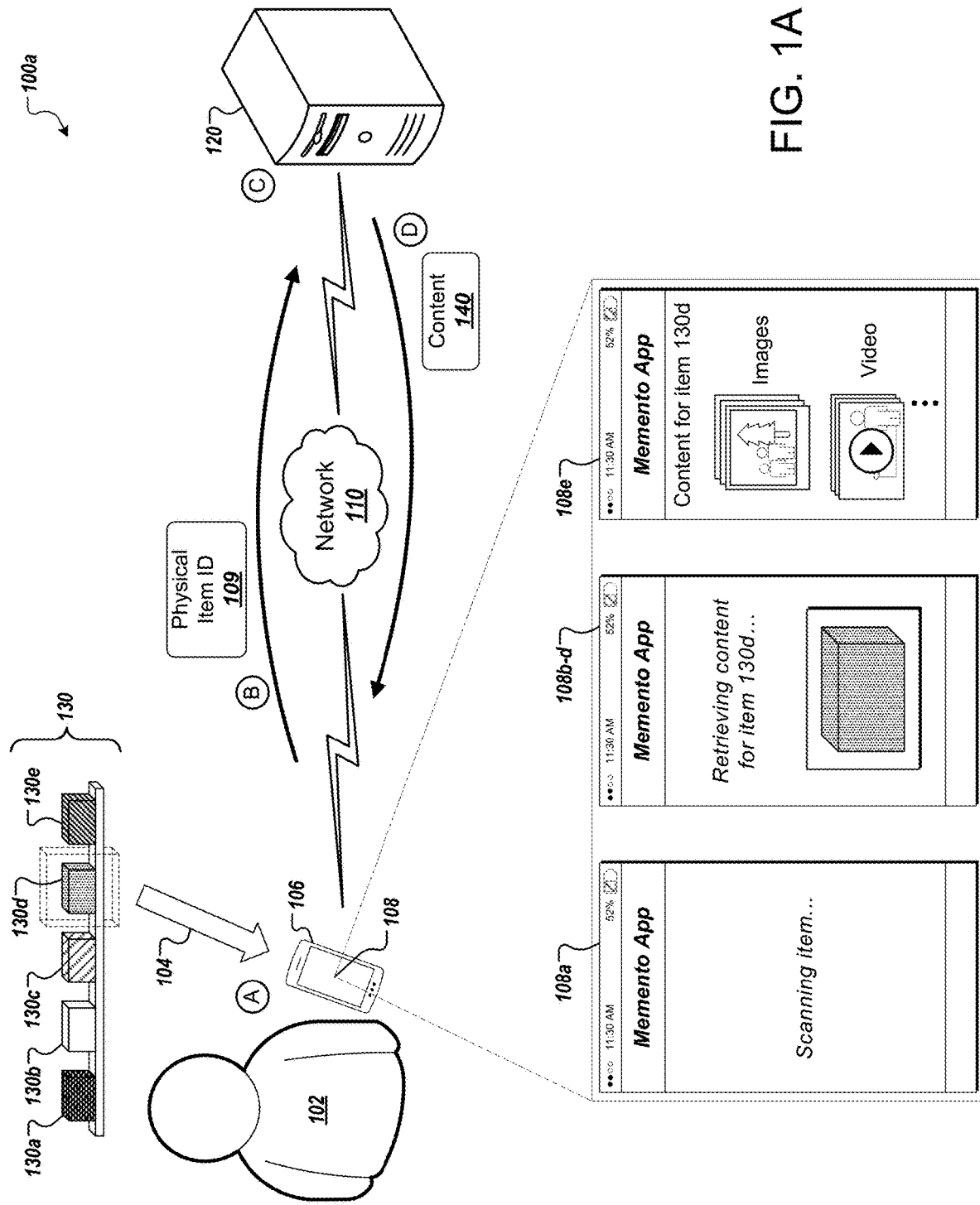

ASSOCIATING PHYSICAL ITEMS WITH CONTENT

CROSS-REFERENCE TO RELATED APPLICATIONS

This patent application claims the benefit of U.S. Provisional Patent Application No. 62/144,189, filed Apr. 7, 2015. The content of U.S. Provisional Patent Application No. 62/144,189 is hereby incorporated by reference into this application as if set forth herein in full.

FIELD

The present specification relates to multimedia storage and retrieval.

BACKGROUND

In recent years, social media and social networking services such as Facebook™, LinkedIn™ Twitter™, Tumblr™, Instagram™ and Snapchat™ have changed the way content associated with friends, family, and events is aggregated, shared, and consumed. Users are now able to capture, store, and interact with images, audio, video, and other content using a variety of different communication devices (e.g., smart phones, personal computers, personal digital assistants (PDAs), etc.), and are doing so with increasing regularity.

SUMMARY

The ease with which one can log and access content associated with themselves, friends, family, business colleagues, and events using such services has, however, transformed this otherwise reflective respite from one's day into an unenjoyable and almost compulsive obligation. This is especially true for children who generally have shorter attention spans than adults and are easily distracted by the deluge of information presented to them when they log on to such a service. The systems and techniques described herein may allow users to physically log and display significant events, activities, or personal relationships in the user's life without overloading the user with mundane information concerning the user's acquaintances or putting the user at risk for privacy violations. In addition, such systems and techniques can also be seen as providing users with meaningful opportunities to journal and later reflect upon the events, activities, or personal relationships in each user's life during the logging and displaying process, via a more stationary element in the user's personal space.

In some aspects, the subject matter described in this specification may be embodied in methods that may include the actions of storing multiple sets of content that each (i) include content having been captured within a different context and (ii) correspond to a different physical item in a set of physical items, where the set of physical items are spatially arranged in positions that are associated with the different contexts within which the multiple sets of content were captured, receiving data that identifies a particular physical item in the set of physical items, in response to receiving the data that identifies the particular physical item, selecting, from among the multiple sets of content that each correspond to a different physical item in the set of physical items, a particular set of content that corresponds to the particular physical item based on the received data that identifies the particular physical item, and causing the particular set of content to be output.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

These other versions may each optionally include one or more of the following features. In some implementations, the particular physical item may include a machine readable identifier that encodes an identifier, and the action of receiving data that identifies the particular physical item in the set of physical items includes receiving the identifier from a client device that read the machine readable identifier.

In some examples, the different contexts may include different time periods such that the multiple sets of content each (i) include content having been captured within a different time period and (ii) correspond to a different physical item in a set of physical items, where the set of physical items are spatially arranged in a chronological order that corresponds to the different time periods within which the multiple sets of content were captured.

In some implementations, before receiving the data that identifies the particular physical item in the set of physical items, the actions may further include determining each of the positions in which one or more physical items in the set of physical items are to be spatially arranged, generating a message that indicates an instruction to spatially arrange the one or more physical items in each of the one or more determined positions, and providing the message for output. In some of such implementations, generating the message that indicates the instruction to spatially arrange the one or more physical items in each of the one or more determined positions may include generating a command to spatially arrange the one or more physical items in each of the one or more determined positions, and providing the message for output may include providing the command to an electromechanical device that physically interacts with the set of physical items. Generating the message that indicates the instruction to spatially arrange the one or more physical items in each of the one or more determined positions may, in some instances, include generating a message suggesting that a user of a client device spatially arrange the one or more physical items in each of the one or more determined positions, and providing the message for output may, in some instances, include providing the message to the client device.

In some examples, the particular set of content that corresponds to the particular physical item may include content having been captured within a particular context that differs from the other contexts within which the multiple sets of content were captured. In these examples, the actions may further include obtaining content that is not included in the multiple sets of content, determining that the obtained content was captured within the particular context, and in response to determining that the obtained content was captured within the particular context, modifying the particular set of content to include the obtained content.

In some implementations, storing the multiple sets of content includes storing multiple sets of content that each include image data, audio data, or a combination of image data and audio data.

In some examples, causing the particular set of content to be output includes providing, to a client device, the particular set of content for output through a user interface of the client device.

In some aspects, the subject matter described in this specification may be embodied in methods that may include the actions of obtaining content having been captured within a particular context, identifying one or more attributes of the particular context within which the content was captured, accessing data that represents a particular arrangement of a set of physical items including data that identifies (i) each physical item in the set of physical items and (ii) each position defined by the particular arrangement, selecting, based at least on the one or more attributes of the particular context and the data that represents the arrangement of the set of physical items, (i) a particular physical item from among the set of physical items and (ii) a particular position from among the multiple positions defined by the particular arrangement, generating an indication that the particular physical item and the particular position correspond to the content, and providing the indication as output.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

In some aspects, the subject matter described in this specification may be embodied in a physical, three-dimensional event log and display system that may include the elements of a base unit including one or more attachment receptors and an inner cavity, one or more timeline cords coupled to the base unit through the attachment receptors and configured to be stored in the inner cavity of the base unit and one or more timeline markers coupled to the timeline cords or to one another for commemorating an event or acquaintance.

Other implementations of this and other aspects include corresponding computer programs and manufacturing devices, configured to perform the actions of synthesizing the physical, three-dimensional event log and display system or a portion thereof, encoded on computer storage devices. A system of one or more computers in control of one or more manufacturing devices can be so configured by virtue of software, firmware, hardware, or a combination of them installed on the system that in operation cause the one or more manufacturing devices to perform the actions. One or more computer programs can be so configured by virtue of having instructions that, when executed by data processing apparatus in control of one or more manufacturing devices, cause the one or more manufacturing devices to perform the actions.

In some aspects, the subject matter described in this specification may be embodied in methods of operation of physically logging and displaying personal event data that may include the actions of providing a base unit including one or more attachment receptors and an inner cavity, attaching one or more timeline cords to the base unit through the attachment receptors, where the timeline cords are configured to be stored in the inner cavity of the base unit, and attaching one or more timeline markers to the timeline cords for commemorating an event or acquaintance.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

FIG. 1A is a diagram of an example of a framework for providing content that corresponds to physical items in a system.

Like reference symbols in the various drawings indicate like elements.

DETAILED DESCRIPTION

Figure 1B:
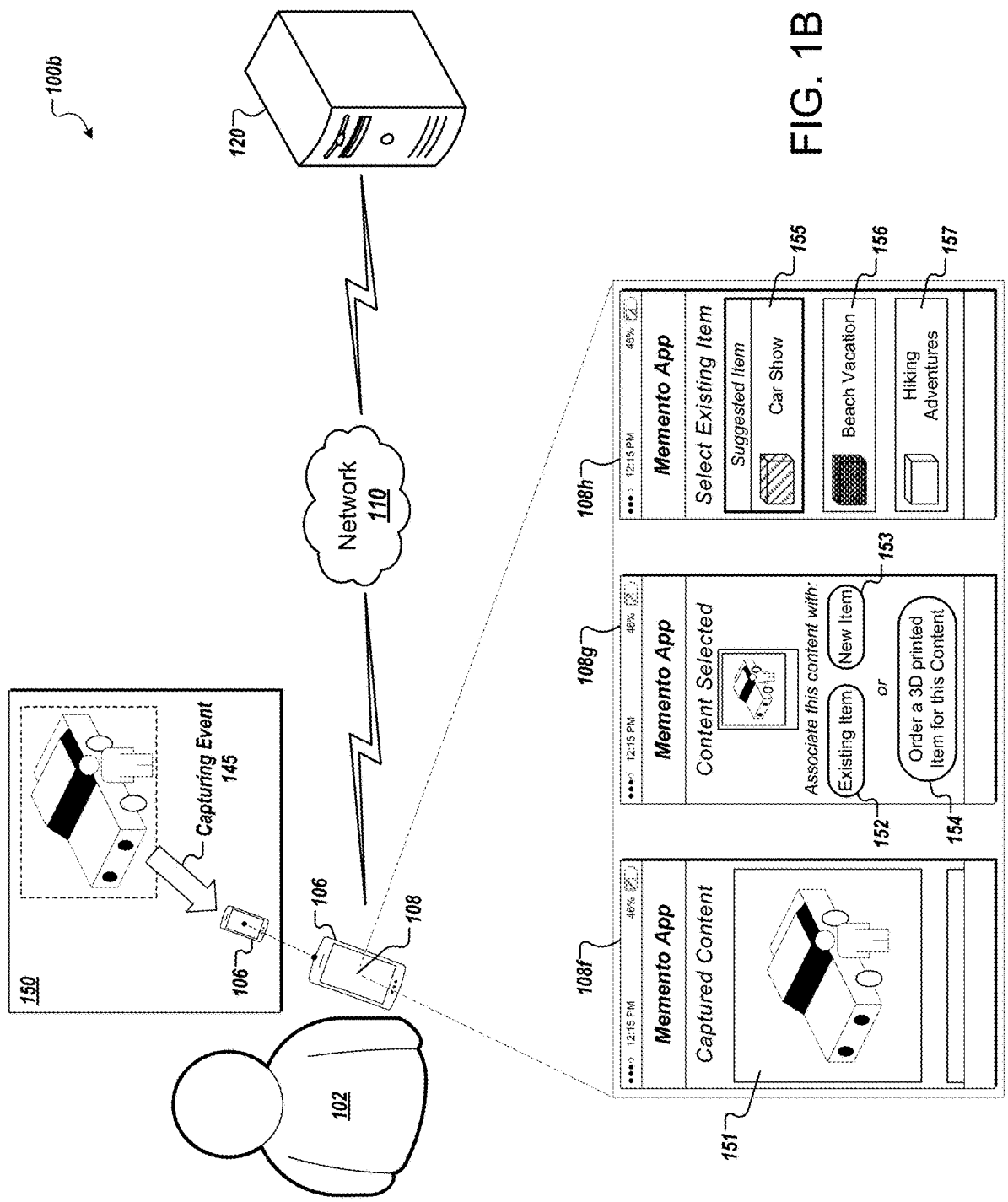
FIG. 1B is a diagram of an example of a framework for storing content in association with physical items in a system.

FIG. 1A is a diagram of an example of a framework for providing content that corresponds to physical items in a system 100a. More particularly, the diagram depicts a user device 106 and a computing device 120 that communicate over a network 110, and an arrangement of physical items 130, that collectively make up system 100a. The diagram also depicts both a flow of data between user device 106, the arrangement of physical items 130, and computing device 120, as well as a screen 108 that is displayed by the user device 106 in various stages, labeled as interface 108a to 108e, in time-sequenced stages "A" to "D," respectively. Briefly, and as described in further detail below, the user device 106 may receive or otherwise obtain data that identifies one or more of the physical items included in the arrangement of physical items 130 and, in response, perform one or more processes in cooperation with the computing device 120 to provide a user 102 of the user device 106 with access to one or more albums of content that are associated with the one or more physical items identified by such data.

In the example depicted in FIG. 1A, the arrangement of physical items 130 may include physical items 130a-e, each of which may be representative of a different event, activity, or personal relationship that is of interest to user 102. That is, physical items 130a-e may include a variety of mementos that can be seen as holding meaning to the user 102. For example, physical items 130a-e may include souvenirs that are representative of the vacations or travels of user 102 during which they were obtained by user 102, photographs and other visual indicia of user 102 and/or acquaintances of user 102 that are representative of the personal relationships of user 102, and any other tangible object of relative commemorative value. In this way, physical items 130a-e may, in the eyes of user 102, be tied to specific times, locations, and other contextual attributes of events, activities, personal relationships, and the like.

In some examples, the arrangement of physical items 130 may correspond to each of physical items 130a-e being spatially arranged in positions according to the contextual attributes they respectively represent. For instance, the arrangement of physical items 130 may correspond to each of physical items 130a-e being spatially positioned in chronological order based on the specific points in time associated with the events, activities, and personal relationships represented by each of physical items 130a-e. In this way, the arrangement of physical items 130 can be seen as a sort of timeline representation of events, activities, and/or personal relationships that are of relevance to user 102. In another example, the arrangement of physical items 130 may correspond to each of physical items 130a-e having positions that correspond to the geographic location at which the events, activities, and personal relationships represented. In this way, the arrangement of physical items 130 can be seen as a sort of geographical map-based representation of the events, activities, and/or personal relationships that are of relevance to user 102. In some examples, the arrangement of physical items 130 may correspond to each of physical items 130a-e being spatially arranged in positions according to a combination of two or more of the different contextual attributes they respectively represent. Examples of different spatial arrangements of physical items are described in more detail in reference to FIGS. 5A-9 below.

In addition, one or more computing devices of system 100a, such as user device 106 and computing device 120, may logically associate each of physical items 130a-e with events, activities, personal relationships, and their respective contextual attributes. In some examples, the one or more computing devices of system 100a may logically associate each of physical items 130a-e with events, activities, personal relationships, their respective positions within the arrangement of physical items 130, and their respective contextual attributes based on input provided by user 102 during a physical item registration process.

In the example of FIG. 1A, the user 102 has accessed an application that runs on user device 106, which may, for example, be that of a mobile computing device, personal digital assistant, cellular telephone, smart-phone, laptop, desktop, workstation, or other computing device. The user device 106 may include one or more sensing or communication components that are capable of capturing or otherwise obtaining information related to the physical items in the arrangement of physical items 130. For example, the user device 106 may include one or more cameras or imaging sensors that, when in the line of sight of one or more of the physical items 130a-e, may be operated by user 102 to take pictures of one or more of the physical items 130a-e. In another example, the user device 106 may include wireless communication circuitry that, when in within communicative range of one or more of the physical items 130a-e, may operate to interrogate radio frequency identification (RFID) components of the one or more physical items 130a-e, or RFID tags that are coupled to the one or more physical items 130a-e. In some instances, the user device 106 may include wireless communication circuitry that, when in within communicative range of one or more of the physical items 130a-e, may be operate to communicate with components of the one or more physical items 130a-e under one or more wireless communication protocols such as near field communication (NFC), IEEE 802.15.1 (Bluetooth), and/or IEEE 802.11 (WiFi) protocols.

The application running on user device 106 may, for instance, be capable of invoking operation of a camera, wireless communication interface, or other sensing or communication components of the user device 106. In some examples, such operation may be invoked based on user interaction with the application running on user device 106. Stage A is representative of a point in time (i) immediately following a point in time at which user 102 has invoked operation of one or more sensing or communication components of user device 106 through interaction with the application running on the user device 106, and (ii) at which user device 106 is invoking operation of the one or more sensing or communication components of user device 106 in an effort to capture or otherwise obtain information related to one or more of the physical items 130a-e.

In this example, user 102 may be operating user device 106 while within the vicinity or environment of the arrangement of physical items 130 such that the one or more sensing or communication components of user device 106 may be capable of reliably capturing or otherwise obtaining information related to one or more of the physical items 130a-e. More specifically, user 102 may, in stage A, be operating user device 106 within the immediate vicinity of a particular physical item 130d so as to, for example, enable user device 106 to take a picture of the particular physical item 130d using a camera of user device 106 or receive data indicating a machine-readable identifier from a wireless communication component of the particular physical item 130d using a wireless communication interface of user device 106.

The user device 106 may capture or otherwise obtain information 104 through operation of such one or more sensing or communication components as triggered by user 102 through the application that is running on the user device 106. In some implementations, the user device 106 may further analyze and/or process information 104 in stage A. In such implementations, the user device 106 may perform one or more processes as specified by the application that is running on the user device 106 to identify the particular physical item 130d based on information 104.

For instance, in examples in which a camera of user device 106 is utilized to capture a digital image of the particular physical item 130d, the user device 106 may perform one or more image recognition processes in an attempt to determine the identity of the physical item shown in the digital image obtained. For instance, one or more visual characteristics of the particular physical item 130*d*, such as shape, coloring, a QR code or barcode printed on one or more exterior portions of the particular physical item 130*d*, and the like. In such examples, the user device 106 may consult one or more databases or sets of information that include image data for each of the physical items 130*a-e* and that associates such image data with various pieces of identification information for each of the physical items 130*a-e*. In examples in which a wireless communication interface of user device 106 is utilized to receive a signal from a wireless communication component of the particular physical item 130*d*, the user device 106 may, for instance, decode or otherwise process the received signal to isolate a machine-readable identifier for the particular physical item 130*d* that is encoded in the signal, and may further evaluate such a machine-readable identifier against one or more databases or sets of information including data that associates machine-readable identifiers for each of the physical items 130*a-e* with other pieces of information for each of the physical items 130*a-e*. While the user device 106 is performing the processes described above in reference to stage A, the application that is running on the user device 106 may, for instance, display information, such as that which is similar to screen 108*a* as depicted in FIG. 1A, that indicates to user 102 that the user device 106 is, as instructed, currently attempting to capture or otherwise obtain information about one or more of the physical items 130*a-e*.

In response to receiving information 104 that identifies the particular physical item 130*d*, the user device 106 may, in stage B, transmit a physical item identifier 109 for the particular physical item 130*d* to the computing device 120 over network 110. In some examples, the user device 106 may obtain physical item identifier 109 as a result of having analyzed and/or processed information 104 in stage A. Since information 104, itself, identifies the particular physical item 130*d*, the user device 106 may, in other examples, forgo such processing and simply use information 104 or a portion thereof as physical item identifier 109.

Upon receiving physical item identifier 109 over network 110 from user device 106, the computing device 120 may, in stage C, perform one or more processes to retrieve content that is associated with the physical item identifier 109 and thus the particular physical item 130*d*. For example, the particular physical item 130*d* may be representative of a particular experience, such as an event, activity, or personal relationship, that user 102 wishes to reflect upon by viewing, listening to, or otherwise consuming content that captures one or more aspects of the particular experience. The computing device 120 may maintain or otherwise have access to multiple, different sets of content that are each associated with a respective one of the physical items 130*a-e*, as well as contextual attributes of the event, activity, or personal relationship represented by the respective one of the physical items 130*a-e*.

The content maintained by computing device 120 may, for example, include content such as images, audio content, video content, and the like having been uploaded by user 102 to the computing device 120 or one or more other computing devices that communicate with the computing device 120. In some examples, the content maintained by computing device 120 may include content having been captured by user 102 through the use of one or more computing devices, such as user device 106, or content having been captured by sources other than user 102, but accessed by or shared with user 102.

Each set of content maintained by computing device 120 may have additional relevance to the respective one of physical items 130*a-e* that they are associated with in that each set of content may include content having been captured within the context of the event, activity, or personal relationship represented by the respective one of physical items 130*a-e*. For example, if one of physical items 130*a-e* were to commemorate or otherwise represent a vacation that user 102 took to Miami, some or all of the set of content maintained in association with this physical item may have been captured at locations within the Miami city limits and/or captured within the particular timeframe during which user 102 went on this vacation. In this example, such content might include pictures of South Beach that user 102 captured with user device 106 while on vacation, video of user 102 dancing at a Miami nightclub that a friend of user 102 captured using their personal smartphone, and a journal entry that user 102 composed on a laptop computer while on a flight to Miami at the beginning of the vacation.

Each file or piece of content maintained by computing device 120 may be classified or otherwise assigned to specific physical items based on one or more attributes of the context within which the respective file or piece of content was captured. Such attributes may be determined based on metadata associated with each file or piece of content, specified by user 102 through interaction with an application running on a client device that communicates with computing device 120, such as user device 106, or a combination thereof. In addition, each file or piece of content may be stored in association with the physical item identifier for the physical item with which each file or piece of content is associated.

In response to receiving physical item identifier 109 for the particular physical item 130*d*, the computing device 120 may proceed to identify and retrieve content that is associated with the physical item identifier 109. For instance, the computing device 120 may evaluate the physical item identifier 109 against a list of physical item identifiers that are stored in association with different sets of content to identify the particular set of content 140 that corresponds to the particular physical item 130*d*. In some examples, the computing device 120 may perform some or all of the analysis and processing as described above in reference to stage A. For example, the user device 106 may, in stage B, transmit raw image data having been captured in stage A to the computing device 120 as physical item identifier 109 and, upon receiving such data from the user device 106, the computing device 120 may apply one or more image processing or other digital signal processing techniques to recognize or otherwise identify the particular physical item 130*d*.

Once the computing device 120 has identified the particular set of content 140, from among the multiple, different sets of maintained content, the computing device may, in stage D, proceed to transmit the particular set of content 140 to the user device 106 over network 110. While the user device 106 awaits content 140 in stages B through D, the application that is running on the user device 106 may, for instance, display information, such as that which is similar to screen 108*b-d* as depicted in FIG. 1A, that indicates to user 102 that system 100*a* is, as instructed, currently attempting to retrieve content that is associated with the particular physical item 130*d*.

Upon receiving the particular set of content 140, the application running on the user device 106 may make content 140 available for access by user 102. For instance, the application that is running on the user device 106 may present content having been captured within the context of the particular experience that the particular physical item 130*d* represents for user selection and viewing through a user interface that may be similar to that of screen 108*e* as depicted in FIG. 1A.

In some implementations, the user device 106 and/or computing device 120 may access the network 110 using a wireless connection, such as a cellular telephone data connection, a Wi-Fi connection, or other wireless connection that can be used for sending data to and receiving data. In some examples, the arrangement of physical items 130 or one or more of physical items 130*a-e* may include one or more communication interfaces that provide connectivity and access to network 110. In some implementations, the network 110 includes one or more networks, such as a local area network, a wide area network, and/or the Internet. One or more of the networks in the network 110 may be wireless, such as a cellular telephone network or a Wi-Fi network.

In addition, the user device 106, computing device 120, and/or arrangement of physical items 130 may rely upon one or more remotely-located devices such as servers, databases, and/or cloud computing devices to perform at least a portion of the functions as described herein. In some examples, some or all of the processes described above may be performed by a single device in system 100*a*. For example, each of the operations described above as occurring at stages A to D may be performed by the user device 106. In some implementations, the device that captures or otherwise obtains information 104 may be logically and/or physically separate from the device that ultimately receives content 140. For instance, a dedicated RFID reading/writing system may obtain information 140 from RFID componentry of one or more of the physical items 130*d*, and provide physical item identifier 109 to one or more computing devices of system 100*a* for use in content retrieval. In some examples, the computing device 120 may, at stage D, simply instruct the user device 106 as to which content is to be presented to the user 102. That is, the content that is presented through the application that is running on the user device 106 may be locally-available to the user device 106, with the computing device 120 simply specifying, for the user device 106, the particular set of locally-available content that is to be presented.

In some implementations, the computing device 120 or another device that is configured to perform some or all of the processes described above in reference to the computing device 120 may, in addition to retrieving and providing content 140, perform one or more processes in response to receiving the physical item identifier 109. For instance, the computing device 120 may transmit commands to one or more devices other than user device 106 that instruct such devices to perform one or more operations that are associated with the physical item identifier 109. In some examples, the computing device 120 may send commands to one or more appliances in the household of user 102. In this way, the computing device 120 may instruct various devices within the household of user 102 (e.g., lighting fixtures, sound systems, televisions, home entertainment systems, set-top boxes, etc.) to perform specific operations such that the ambience of the household of user 102 is adjusted when user 102 is provided with content 140 for an enhanced and more immersive user experience. For example, the computing device 120 may provide commands to dim household lighting, change the color of household lighting to match tones and hues of content 140, play songs or ambient sound through speakers within the household, display social media streams or live video streams on a television within the household, and the like. The commands associated with each file or piece of content maintained by the computing device 120 may be determined based on attributes of with each file or piece of content, determined based on metadata associated with each file or piece of content, specified by user 102 through interaction with an application running on a client device that communicates with computing device 120, such as user device 106, or a combination thereof.

FIG. 1B is a diagram of an example of a framework for storing content in association with physical items in a system 100*b*. System 100*b* may, for instance be similar to that of system 100*a* as described above in reference to FIG. 1A. More particularly, the diagram depicts user device 106 and computing device 120, that collectively make up system 100*b*. The diagram also depicts both a flow of data between user device 106 having captured content and computing device 120. Briefly, and as described in further detail below, the user device 106 may capture or retrieve content and provide such content to computing device 120 so that it may be stored in association with a physical item and maintained with other sets of content by computing device 120 in a manner similar to that which has been described above in reference to FIG. 1A. The processes represented in FIG. 1B may, for example, be performed by user device 106, computing device 120, and/or any other device having been described above in reference to FIG. 1A.

In this particular example, user 102 may have used user device 106 to capture an image 151, and may wish to associate this content with a particular physical item that is representative of a car show that user 102 attended. In this way, user 102 may be able to, at a later point in time, review image 151 in response to taking a picture of the particular physical item with user device 106 or establishing communication between user device 106 and a wireless communication component of the particular physical item, such that user 102 may reflect on memories of the car show. User 102 may, for instance, interact with an application that is running on the user device 106 so as to capture or access image 151, and proceed to associate image 151 with the physical item of their choosing. For instance, the application that is running on the user device 106 may present user 102 with an interface similar to that of screen 108*f*, so as to allow user 102 to capture and/or specify the content that is to be associated with a physical item.

Image 151 may have been captured by user device 106 in a capturing event 145 that occurred within a particular context 150. For example, the particular context 150 may correspond to the particular time and place at which the capturing event 145 in which user device 106 captured image 151 occurred. In the example of FIG. 1B, the capturing event 145 may have occurred while the car show was being hosted and at the convention center at which the car show was hosted. Additional attributes of the particular context 150 within which capturing event 145 occurred may, for example, include environmental conditions, the type of device used to capture the content, the identity of the user of the device used to capture the content, persons and other objects shown or otherwise indicated in the captured content, parties physically present for capturing event 145, conditions reflected in data gleaned from social media and other web resources, or a combination thereof.

Upon specifying that image 151 is to indeed be associated with a physical item through interaction, the user 102 may be presented with a screen 108*g* through the application that is running on the user device 106 prompting user 102 to specify whether image 151 is to be associated with an existing or new physical item. For example, the application may render user interface elements, such as buttons 152 and 153, to allow user 102 to select whether to associate image 151 with an existing physical item or a new physical item. Examples of existing physical items may include those of which user 102 has already registered as being associated with content, such as any of physical items 130*a-e* as described above in reference to FIG. 1A.

In examples in which user 102 wishes to associate image 151 with a new physical item, the application that is running on the user device 106 may prompt user 102 to provide additional information so as to register a new physical item. For instance, the application may require user 102 to provide one or more images of the new physical item so as to facilitate image recognition thereof, provide RFID tag information or another machine-readable identifier for the new physical item, information regarding the event, activity, and/or personal relationship that the new physical item is intended to represent, specific attributes of the contexts within which content that is to be associated the new physical item was or is going to be captured, and the like.

In some examples, new physical items may include those that are distributed to persons, such as user 102, in advance of an event or activity. For instance, the entity hosting the car show may provide user 102 and other attendees of the car show with miniature toy cars that are embedded with RFID tags or are otherwise intended to serve as physical items that are compliant with the systems and techniques described herein. Such new physical items may include 3D-printed items or items constructed or synthesized through one or more other processes. In such examples, new physical items that are distributed or otherwise made available to persons may be associated with a set of one or more predefined contextual attributes. That is, such a new physical item may specify the location, time, and the like that corresponds to the event, activity, and/or personal relationship that it is intended to represent. In this way, users may be able to begin capturing content and associating it with newly-received physical items during an event or activity, without having to perform one or more physical item registration processes. In addition, new physical items that are distributed or otherwise made available to persons may already be associated with some amount of content. Such content may, for example, include exclusive content that is only available to those in possession of such physical items and promotional material. For instance, the entity hosting the car show may upload race track footage of cars being featured at the car show, exclusive videos of car designers being interviewed about the cars being featured at the car show, an image of a coupon including a unique QR code that is redeemable at a kiosk onsite at the car show, and the like.

In this way, user 102 may be able to immediately access such content upon using a computing device, such as user device 106, to capture or otherwise obtain information about the miniature toy car in a manner similar to that having been described above in reference to FIG. 1A. In some instances, the content made available to those in possession of a mass-distributed physical item, such as the miniature toy car described above, may include crowd-sourced content. For example, if user 102 were to associate image 151 from the car show with such a miniature toy car, other persons in possession of another one of the mass-distributed miniature toy cars may, upon leveraging a computing device to capture or otherwise obtain information about the miniature toy car in their possession, be provided with image 151 or access to image 151. In this way, attendees of events may be able to share content captured within the context of such events with each other. In some of such instances, persons in possession of such a new physical item may be able to indicate whether given content is to be shared publicly with others in possession of such physical items, is to be maintained as part of a private set of content, or a combination thereof.

In some examples, such new physical items that are distributed to persons, such as user 102, during or in advance of an event or activity may not include a wireless communication component, such as an RFID tag. Rather, such a new physical item may be identified by a system, such as system 100*a* or 100*b*, by virtue of the host of the representative event/activity or distributor of such new physical items having registered the physical item with the system and having provided image and/or three-dimensional modeling information for the physical item that is made available to user device 106 and/or computing device 120 for physical item identification purposes. In this way, user device 106 and/or computing device 120 may leverage such image and/or three-dimensional modeling information to recognize or otherwise identify such new physical items from images taken by user device 106 or other data, such as information 104 as described above in reference to FIG. 1A as being obtained by user device 106, through a process similar to that of stage A. In these examples, the host of the representative event/activity or distributor of such new physical items may be able to dramatically enhance the user experience provided by freebies and otherwise lackluster items that are distributed to the masses. For instance, the host of the car show may be able to leverage one or more of the systems and techniques described herein to quickly and easily register their entire inventory of pens that say "Car Show 2016" in association with race track footage of cars being featured at the car show, exclusive videos of car designers being interviewed about the cars being featured at the car show, an image of a coupon including a unique QR code that is redeemable at a kiosk onsite at the car show, and the like.

In some implementations, user device 106 may present a series of one or more prompts to user 102 through the application that is running on the user device 106 in response to system 100*a* and/or 100*b* having received data that identifies such a new physical item. Such prompts may, for example, serve to instruct user 102 to capture various pieces of content. In this way, such new physical items may, in these implementations, be leveraged by the host of the representative event/activity or distributor of such new physical items to provide those in possession of such new physical items with a sort of scavenger hunt or checklist of things to do and/or see. Such techniques may, for example, be used to greatly enhance user experience provided at events, landmarks, amusement parks, and the like. For instance, the host of the car show may be able to leverage such techniques to provide those in possession of the miniature toy cars described above with a series of one or more prompts that encourage attendees of the car show to take a picture with a particular sports car being featured at the car show, record a video while riding a race track simulator, and the like. In some examples, such prompts may serve to provide system 200*a* and/or 200*b* with contextual information. For instance, the host of the car show may be able to leverage such techniques to provide those in possession of the miniature toy cars described above with a series of one or more prompts that encourage attendees of the car show to use a computing device to capture at least 30 seconds of video while GPS functionality is enabled on the computing device, or take a picture with a facially-recognizable subject. This may, for instance, be seen as a sort of calibration process by which the system 100a and/or 100b may be quickly and easily trained to associate contextual attributes gleaned from content captured responsive to these prompts.

In some implementations, user 102 may be provided with the option to order a 3D-printed item to be used as the new physical item that is to be associated with image 151. For example, the application may render one or more user interface elements, such as button 154, to allow user 102 to order a 3D-printed item that is representative of the car show. In such implementations, when ordering the 3D print, user 102 may be prompted to provide the same or similar information as in the new item registration process described above, and may be prompted to provide additional information regarding the physical specifications of the item to be printed. In some examples, the user 102 may be able to request that a replica of a physical object be printed at this juncture. User 102 may be able to provide detailed information indicating the physical dimensions of a real life object, such as results of performing one or more 3D scans of such an object, to the application that is running on the user device 106 so as to order a 3D printed version of the object. In this particular example, user 102 may, for instance, perform a 3D scan of the keys to one of the cars shown at the car show, using user device 106 or another computing device, and interact with the application that is running on the user device 106 to request that a physical, 3D replica of such keys be printed in commemoration of the car show.

In some instances, the 3D print that is ultimately produced and provided to user 102 may be embedded with one or more wireless communication components that stores and transmits a machine-readable identifier for the 3D print. In this way, the user device 106 may be able to capture or otherwise obtain information about the new, 3D-printed item as soon as it is delivered to user 102.

In some examples, user 102 may be provided with the option to be provided with one or more files or other computer program products that may be used in the printing or synthesis of a new, 3D-printed item to be used as the new physical item that is to be associated with image 151. For instance, user 102 may, for instance, perform a 3D scan of the keys to one of the cars shown at the car show, using user device 106 or another computing device, and interact with the application that is running on the user device 106 to request that user device 106 and/or another computing device be provided with one or more files or other computer program products that may be used in the printing or synthesis of a physical, 3D replica of keys. User 102 may then, for example, provide such files to a local shop that provides 3D printing services so that the physical, 3D replica of such keys may be printed in commemoration of the car show. In another example, user 102 may share the files with friends and others who may have access to 3D printers or other manufacturing devices.

The one or more files or computer program products may be so configured by virtue of having instructions that, when executed by data processing apparatus in control of one or more manufacturing devices, such as a 3D printer, cause the one or more manufacturing devices to perform actions of synthesizing a physical item that is compliant with one or more of the systems and techniques described herein. Physical items having been synthesized using such files or other computer program products may be registered with one or more of the systems described herein to correspond to one or more sets of content and contextual attributes.

In the example depicted in FIG. 1B, the user 102 may have indicated that image 151 is to be associated with an existing physical item and is thus prompted to specify the exact existing physical item with which image 151 is to be associated. For example, the application that is running on the user device 106 may present user with an interface similar to that of screen 108h that enables user 102 to select between existing physical items through interaction with any of user interface elements 155-157. In some implementations, the system 100b may determine the likelihood that content, such as image 151, is to be associated with each of the existing physical items. With such information, the system 100b may provide user 102 with a suggestion of which physical item having been determined to be most likely to be associated with the given content or, in some examples, may forgo prompts such as those described in reference to screens 108g and/or 108h and may automatically select an existing physical item and associate the given content with the selected item. Such determinations may be made based on attributes of image 151, and attributes of context 150, as indicated by metadata associated with image 151, specified by user 102 through interaction with an application running on a client device that communicates with computing device 120, such as user device 106, or a combination thereof. In some examples, user 102 may be able to select multiple physical items with which to associate content. In addition to enabling content to be uploaded in association with one or more physical items and contextual attributes, system 100b may enable persons in possession of physical items that are registered with system 100b, such as user 102, to remove and/or modify content associated with physical items in the possession of such persons and/or user accounts maintained for such persons in connection with services provided by system 100b.

In the example of FIG. 1B, the system 100b may analyze metadata associated with image 151, such as the GPS coordinates of the user device 106 during capturing event 145, and determine that image 151 was taken onsite at the same geographic location at which the car show is known to be hosted. On the basis of such a determination, the system 100b may have, in the example of FIG. 1B, determined that, from among the existing physical items registered by user 102, the physical item that is representative of the car show is most likely the physical item with which user 102 wishes to associate image 151. For this reason, the application that is running on the user device 106 may, as shown in screen 108h, suggest that user 102 associate image 151 with the existing physical item that is representative of the car show over other existing physical items that are representative of a beach vacation and hiking adventures. In another example, the system 100b may have recognized that a car is shown in image 151 and, on the basis of such, determine that image 151 most likely corresponds to the existing physical item that is representative of the car show. In addition, such techniques could be leveraged to suggest or determine labels, tags, and various other pieces of information that may be used to sort and/or categorize content.

Figure 2A:
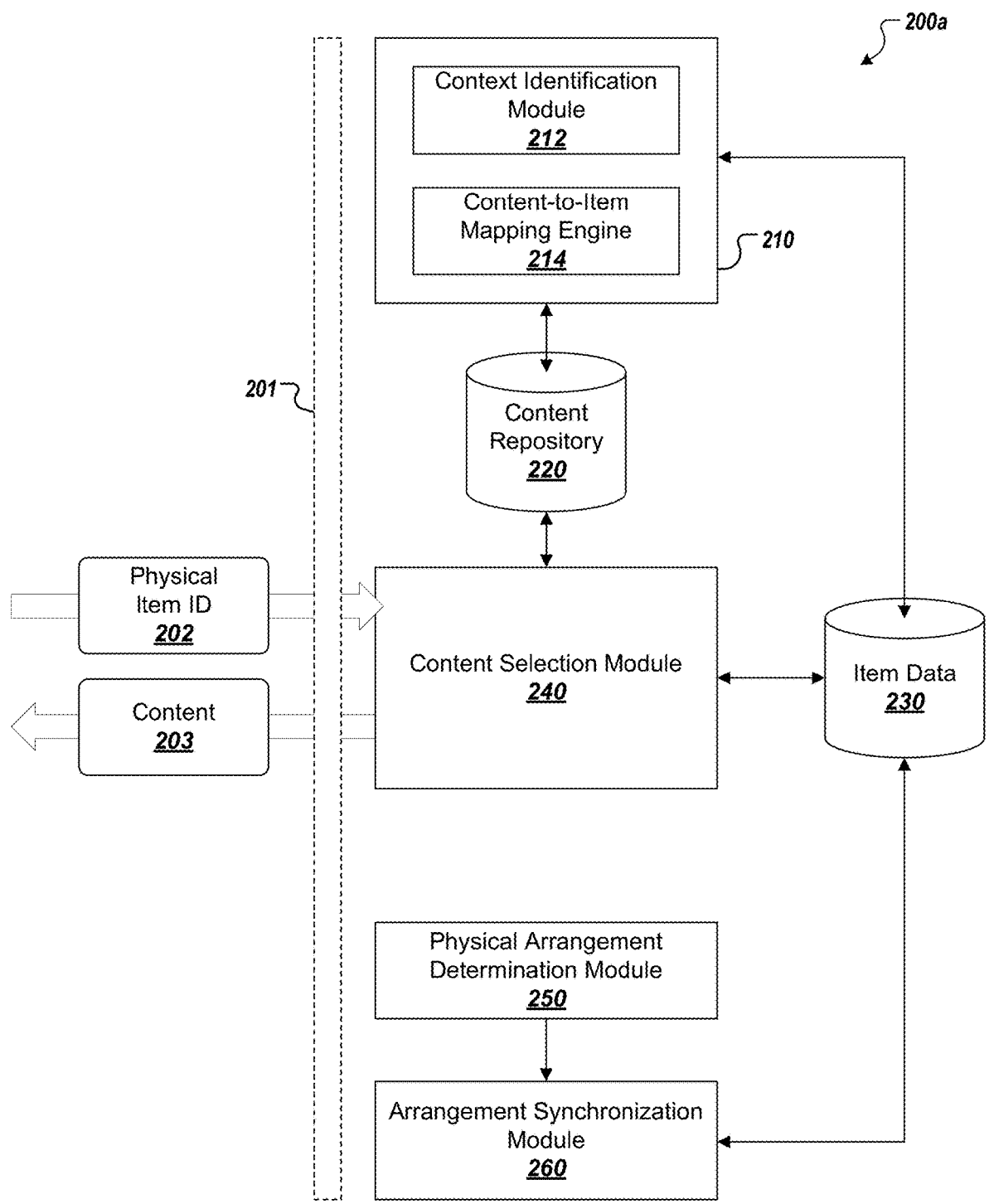
FIG. 2A is a diagram of a system for providing content that corresponds to physical items.

FIG. 2A is a diagram of a system 200a for providing content that corresponds to physical items. More particularly, system 200a includes a content management module 210, content repository 220, item data 230, content selection module 240, physical arrangement determination module 250, and arrangement synchronization module 260. Although depicted as a singular system, the architecture of system 200a may be implemented using one or more networked computing devices. In some implementations, system 200a may be utilized to execute the processes described above in association with FIG. 1A.

The content repository 220 may store multiple different sets of content that each include content having been captured within a different context and correspond to a different physical item in a set of physical items. The item data 230 may store information about each physical item in the set of physical items, including information that logically associates each physical item with one or more respective sets of content that are stored in the content repository 220, the positions of each physical item within an arrangement of physical items, and the attributes of the one or more contexts within which the one or more respective sets of content that are stored in the content repository 220 were captured.

The content selection module 240 may be a module that receives data that identifies a particular physical item, maps the received data to a corresponding set of content, and generates an output that includes or enables access to the corresponding set of content. In the example depicted in FIG. 2A, the content selection module receives physical item identifier 202 through one or more communication interfaces 201. The content selection module 240 may access content repository 220 and item data 230, and determine that the physical item identifier 202 corresponds to content 203 that is stored in content repository 220. Upon determining that the physical item identifier 202 corresponds to content 203 that is stored in content repository 220, the content selection module 240 generates and provides output that includes content 203 through one or more communication interfaces 201.

Figure 2B:
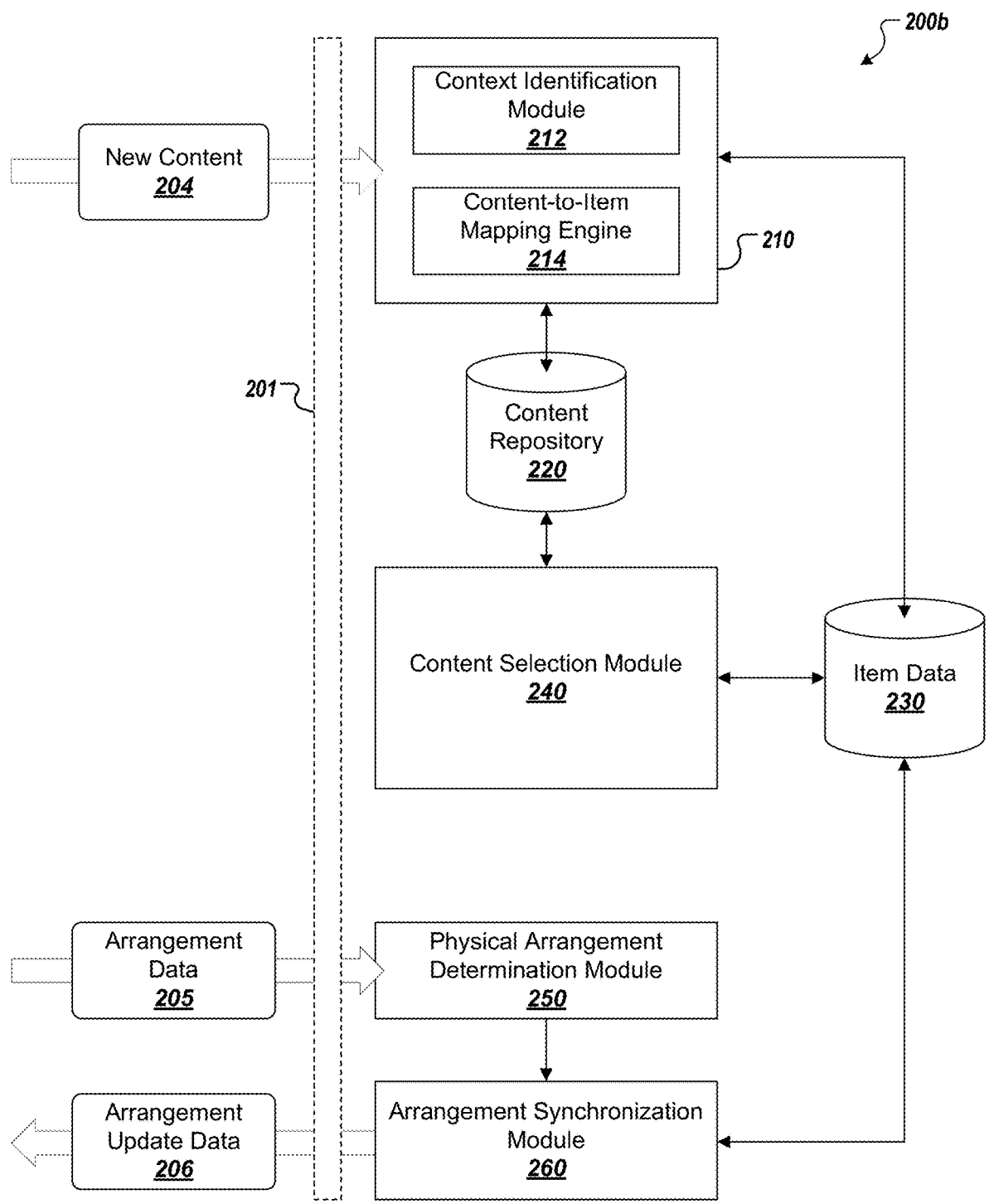
FIG. 2B is a diagram of a system for storing content in association with physical items.

FIG. 2B is a diagram of a system 200b for storing content in association with physical items. More particularly, system 200b includes the content management module 210, content repository 220, item data 230, content selection module 240, physical arrangement determination module 250, and arrangement synchronization module 260. The system 200b may be the same as or similar to system 200a as described above in reference to FIG. 2A. Although depicted as a singular system, the architecture of system 200b may be implemented using one or more networked computing devices. In some implementations, system 200b may be utilized to execute the processes described above in association with FIG. 1B.

The content management module 210 may be a module that receives new content, identifies one or more attributes of the context within which the received content was captured, maps the one or more identified attributes of the context within which the received content was captured to a particular physical item, and generates an indication that the received content corresponds to the particular physical item. To provide such functionality, the content management module 210 may at least include a context identification module 212 and a content-to-item mapping engine 214. In the example depicted in FIG. 2B, the content management module 210 receives new content 204 through one or more communication interfaces 201. The new content 204 may, for instance, correspond to at least one file or individual piece of audio, visual, or multimedia content, such as an image, video, audio clip, textual document, and the like.

The content management module 210, and more specifically the context identification module 212 of content management module 210, may identify one or more attributes of the context within which new content 204 was captured. Context identification module 212 may extract such attributes from new content 204, itself, may identify such attributes based on metadata that is associated with new content 204 and/or user input specifying such attributes, or a combination thereof. That is, the context identification module 212 may receive metadata and/or user input through one or more communication interfaces 201. New content 204, as well as metadata and/or user input that is associated with new content 204, may be provided to content management module 210 by one or more computing devices, such as a client device similar to the user device 106 as described above in reference to FIGS. 1A-1B, and through one or more communication interfaces 201.

The content management module 210, and more specifically the context-to-item mapping engine 214, may evaluate the one or more attributes of the context within which new content 204 was captured, as identified by context identification module 212, against information that associates each of multiple, different physical items with one or more contextual attributes of a respective event, activity, or personal relationship. The context-to-item mapping engine 214 may access content repository 220 and item data 230, as described above in reference to FIG. 2A, to determine which particular one of the multiple, different physical items is associated with the one or more attributes identified by the context identification module 212.

Upon determining that the new content 204 is associated with a particular one of the multiple, different physical items, the content-to-item mapping engine 214 of content management module 210 may generate an indication that new content 204 corresponds to the particular one of the multiple, different physical items. Such an indication may, for instance, serve to indicate that new content 204 is to be stored in association with a particular physical item. System 200b may proceed to store new content 204 in content repository 220 and information that associates new content 204 with the particular physical item in content repository 220 and/or item data 230. In this way, the content selection module 240 may be able to easily provide new content 204 or access to new content 204 to one or more computing devices in response to receiving data that identifies the particular physical item through one or more communication interfaces 201. For instance, the processes performed by the content management module 210 may enable the content selection module 240 to return new content 204 to one or more computing devices in a manner similar to that of providing content 203 or access to content 203 in response to receiving physical item identifier 202, as described above in reference to FIG. 2A.

The physical arrangement determination module 250 may be a module that receives data that indicates one or more characteristics of physical items or an arrangement thereof, determines the current arrangement of physical items based on such data, and generates and provides output that indicates the current arrangement of physical items. In the example depicted in FIG. 2B, the physical arrangement determination module 250 receives arrangement data 205 through one or more communication interfaces 201.

The arrangement data 205 may, for instance, correspond to data that is output by one or more sensing elements that monitor a set of physical items that is indicative of the positions at which each physical item in the set of physical items is arranged. For example, the arrangement data 205 may include real-time images of a set of physical items, such as physical items 130a-e as described above in reference to FIGS. 1A-1B, that show the positions at which each physical item is currently located, such as the positions at which each of physical items 130a-e as described above in reference to FIGS. 1A-1B are currently located within the arrangement of physical items 130. The one or more sensing elements may, in some examples, be standalone sensors and/or communication devices that are located within the environment of one or more physical items. In some implementations, such sensing elements may be included as part of a system that physically contains and/or secures a set of physical items, such as those described in more detail below in reference to FIGS. 5A-9.

The arrangement determination module 250 may be a module that receives data from the physical arrangement determination module 250 that indicates the actual, current arrangement of physical items, evaluates such data against the physical arrangement of items as indicated by at least a portion of item data 230 to determine whether there are any discrepancies between the data received from the physical arrangement determination module 250 and the physical arrangement of items as indicated by at least a portion of item data 230, and generates and provides an output indicating instructions for changing the actual, current positions of physical items such that the actual, current arrangement of physical items is aligned with the physical arrangement of items as specified in item data 230. In the example depicted in FIG. 2B, the arrangement synchronization module 260 receives input from physical arrangement determination module 250 and also accesses item data 230. The physical item arrangement that is indicated in item data 230 may, for instance, be reflected by spatial positioning data that is stored in association with each physical items in a set of physical items that are arranged according to one or more attributes of the context within which the content that is associated with each physical item was captured.

In some examples, such a physical item arrangement indicated in item data 230 may be determined based at least on user input that is provided through one or more communication interfaces 201. For instance, a user that interacts with an application associated with system 200b may define or otherwise specify a desired arrangement of physical items and/or a desired positioning scheme under which physical items are to be spatially arranged. That is, a user may indicate that they wish for the physical items that are of interest to the user to be arranged chronologically according to the time at which the content to be associated with each physical item is to have been captured in correspondence to the event, activity, or personal relationship respectively represented by each physical item.

In the example depicted in FIG. 2B, the arrangement synchronization module 260 evaluates the input received from physical arrangement determination module 250 and against that of item data 230 to determine whether the actual, current arrangement of physical items should be modified, and if so, the manner in which the actual, current arrangement of physical items must be modified so as to align with the physical item arrangement indicated in item data 230. For instance, the arrangement synchronization module 260 may compare the arrangement indicated by the physical arrangement determination module 250 to the arrangement indicated by the item data 230 to determine whether there are any differences.

In the event that there are differences, the arrangement synchronization module 260 may generate arrangement update data 206 and provide such data as output through one or more communication interfaces 201. The arrangement update data 206 may include instructions that indicate the specific modifications that are to be made to the actual, current arrangement of physical items so as to be in alignment with the arrangement indicated in item data 230. In some examples, system 200b may output arrangement update data 206 in the form of one or more messages that are transmitted to one or more client devices. For example, arrangement update data 206 may correspond to a text message or email that is sent to a device belonging to a user of the arrangement of physical items that provides the user with suggestions of how to physically modify the actual, current arrangement of physical items. In other examples, the arrangement update data 206 may be a command that is provided to an electromechanical device that physically interacts with the actual arrangement of physical items. In such examples, the electromechanical device may, in response to receiving arrangement update data 206, operate to physically manipulate the actual arrangement of physical items in accordance with the instructions generated by the arrangement synchronization module. Examples of such an electromechanical device and other mutable structures are described in more detail below in reference to FIG. 5A.

Figure 3:
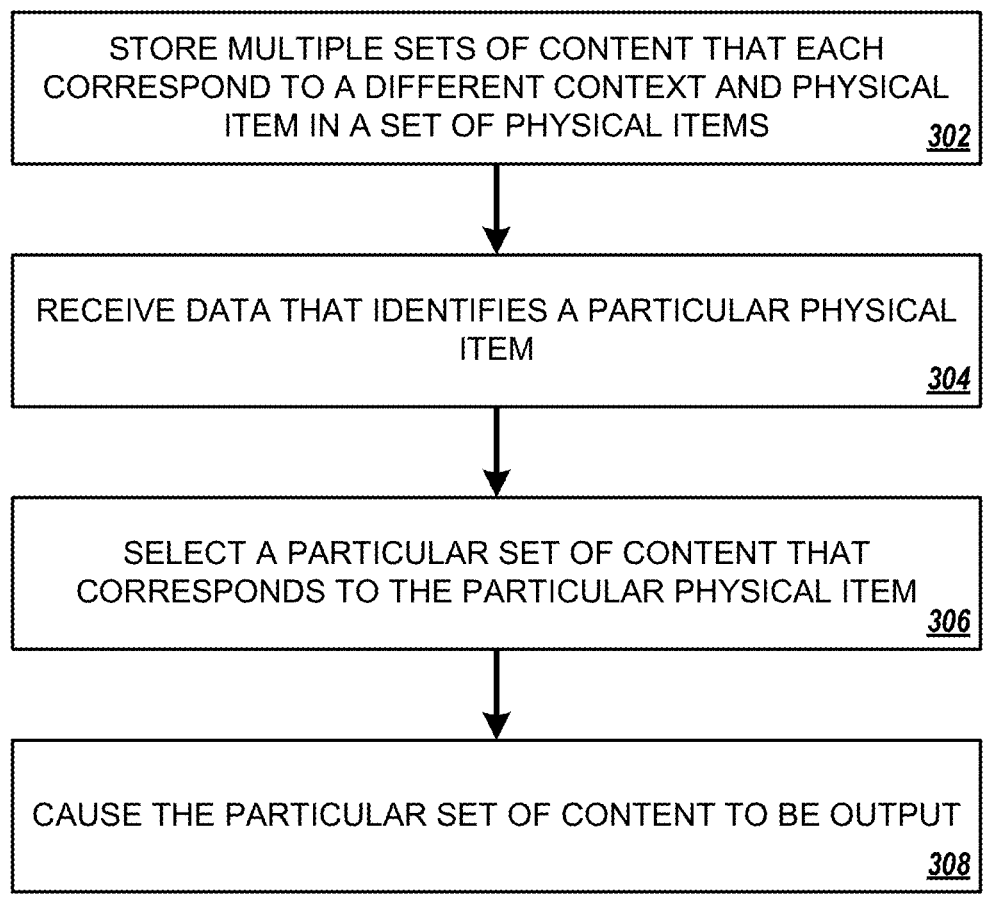
FIG. 3 is a flowchart of an example of a process for providing content that corresponds to physical items.

FIG. 3 is a flowchart of an example of a process 300 for providing content that corresponds to physical items. The following describes the process 300 as being performed by components of systems that are described with reference to FIGS. 1A and 2A. However, the process 300 may be performed by other systems or system configurations. Briefly, the process 300 may include storing multiple sets of content that each correspond to a different context and physical item in a set of physical items (302), receiving data that identifies a particular physical item (304), selecting a particular set of content that corresponds to the particular physical item (306), and causing the particular set of content to be output (308).

In more detail, the process 300 may include storing multiple sets of content that each (i) include content having been captured within a different context and (ii) correspond to a different physical item in a set of physical items (302), where the set of physical items are spatially arranged in positions that are associated with the different contexts within which the multiple sets of content were captured. For example, this may correspond to the content repository 220 as described above in references to FIGS. 2A-2B storing multiple sets of content.

The process 300 may include receiving data that identifies a particular physical item in the set of physical items (304). This may, for instance, correspond to the content selection module 240 receiving physical item identifier 202 through one or more communication interfaces 201, as described above in reference to FIG. 2A, which may, in turn, correspond to the user device 106 receiving information 104 and/or computing device 120 receiving physical item identifier 109, as described above in reference to FIG. 1A.

The process 300 may include, in response to receiving the data that identifies the particular physical item, selecting, from among the multiple sets of content that each correspond to a different physical item in the set of physical items, a particular set of content that corresponds to the particular physical item based on the received data that identifies the particular physical item (306). For example, this may correspond to the content selection module 240, as described above in reference to FIGS. 2A-2B, selecting, from among the multiple sets of content stored in content repository 220, the particular set of content 203 in response to receiving the physical item identifier 202. Similarly, this may correspond to content 140 being selected from among the multiple sets of content maintained by system 100a in response to the user device 106 receiving information 104 and/or computing device 120 receiving physical item identifier 109, as described above in reference to FIG. 1A.

The process 300 may include causing the particular set of content to be output (308). This may, for instance, correspond to content selection module 240 generating data that includes content 203 or that provides access to content 203, and provided such data as output to one or more computing devices through one or more communication interfaces 201.

Similarly, this may correspond to computing device 120 providing content 140 or access to content 140 to the user device 106 in response to the user device 106 receiving information 104 and/or computing device 120 receiving physical item identifier 109, as described above in reference to FIG. 1A.

In some implementations, the particular physical item may include a machine readable identifier that encodes an identifier. This may, for example, correspond to one or more wireless communication components of physical items 130*a-e*, as described above in reference to FIG. 1A, storing an identifier that may be captured or otherwise obtained by the user device 106. In such implementations, receiving data that identifies the particular physical item in the set of physical items may include receiving the identifier from a client device that read the machine readable identifier. For example, this may correspond to computing device 120, as described above in reference to FIG. 1A, receiving the physical item identifier 109 from the user device 106 over network 110. In some examples, the machine readable identifier corresponds to one or more characteristics of the particular physical item's visual appearance. This may, for example, correspond to one or more characteristics of the appearance of physical items 130*a-e*, as described above in reference to FIGS. 1A-2B, serving as an identifier for each of physical items 130*a-e* as specified by image and/or three-dimensional modeling information that is accessible to the system for use in image recognition or other physical item identification processes. Image and/or three-dimensional modeling information may, in some instances, be made available to such a system by end-users, event/activity hosts, physical item manufacturers, physical item distributors, or a combination thereof.

In some examples, the different contexts include different time periods such that the multiple sets of content each (i) include content having been captured within a different time period and (ii) correspond to a different physical item in a set of physical items, where the set of physical items are spatially arranged in a chronological order that corresponds to the different time periods within which the multiple sets of content were captured. For instance, this may correspond to the arrangement of physical item 130, as described above in reference to FIG. 1A, representing a timeline.

In some implementations, the process 300 may further include, before receiving the data that identifies the particular physical item in the set of physical items, determining each of the positions in which one or more physical items in the set of physical items are to be spatially arranged, generating a message that indicates an instruction to spatially arrange the one or more physical items in each of the one or more determined positions, and providing the message for output. This may, for instance, correspond to the arrangement synchronization module 260 determining, generating, and outputting the arrangement update data 206, as described above in reference to FIG. 2B, based on item data 230 and input provided by the physical arrangement determination module 250 based on arrangement data 205. In such implementations, generating the message that indicates the instruction to spatially arrange the one or more physical items in each of the one or more determined positions may include generating a command to spatially arrange the one or more physical items in each of the one or more determined positions, and providing the message for output may include providing the command to an electromechanical device that physically interacts with the set of physical items. For example, this may correspond to the arrangement update data 206, as described above in reference to FIG. 2B, being provided to an electromechanical device or other mutable structure through one or more communication interfaces 201 by system 200*b*. The electromechanical device or other mutable structure may, for instance, modify the current arrangement of physical items so as to align the actual, current arrangement of physical items with that of the arrangement indicated in item data 230. In other examples, generating the message that indicates the instruction to spatially arrange the one or more physical items in each of the one or more determined positions may, in such implementations, include generating a message suggesting that a user of a client device spatially arrange the one or more physical items in each of the one or more determined positions, and providing the message for output may, in such implementations, include providing the message to the client device. This may, for instance, correspond to the arrangement update data 206, as described above in reference to FIG. 2B, being provided to a client device, such as user device 106, in the form of a text message or email suggesting that user 102 manually modify the actual, current arrangement of physical items to conform with the arrangement of physical items that is indicated in item data 230.

In some examples, the particular set of content that corresponds to the particular physical item may include content having been captured within a particular context that differs from the other contexts within which the multiple sets of content were captured. In such examples, the process 300 may, in some implementations, further include obtaining content that is not included in the multiple sets of content, determining that the obtained content was captured within the particular context, and in response to determining that the obtained content was captured within the particular context, modifying the particular set of content to include the obtained content. This may, for instance, correspond to the content management module 210, as described above in reference to FIG. 2B, obtaining new content 204 that is not included in content repository 220, the context identification module 212 of the content management module 210 identifying one or more attributes of the context within which the new content 204 was captured, and the content-to-item mapping engine 214 performing one or more processes of determining how new content 204 is to be stored and maintained by system 200*b* and storing new content 204 in the content repository 220. The content selection module 240 may then have access to new content 204, such that it may provide new content 204 or access to new content 204 in response to receiving a physical item identifier 202 that is associated with new content 204.

In some implementations, storing the multiple sets of content may include storing multiple sets of content that each include image data, audio data, or a combination of image data and audio data. For example, this may correspond to the content repository 220, as described above in reference to FIGS. 2A-2B, storing multiple different pieces of content including image, audio, and/or video files. In some implementations, storing the multiple sets of content may include storing multiple sets of content in association with information that indicates the respective contexts within content included in the multiple sets of content were captured. This may, for instance, correspond to system 200*a* and/or 200*b*, as described above in reference to FIGS. 2A-2B, obtaining and storing user input and/or metadata, such as that which has been described above in reference to FIGS. 1A-2B, that indicates one or more attributes of the context within which the content maintained by the system was captured.

In some examples, causing the particular set of content to be output may include providing, to a client device, the particular set of content for output through a user interface of the client device. This may, for instance, correspond to computing device 120, as described above in reference to FIG. 1A, providing content 140 to the user device 106 over network 110. Similarly, this may also correspond to the system 200*a*, as described above in reference to FIG. 2A, providing content 203 to one or more computing devices through one or more communication interfaces 201. In some implementations, the process 300 may further include providing, to the client device or one or more other computing devices within the environment of the client device, a particular set of instructions to perform operations that are associated with the particular set of content. For example, this may correspond to the computing device 120, as described above in reference to FIGS. 1A-1B, providing instructions to one or more smart appliances within the home of user 102 so as to provide ambience to the environment of user 102 that compliments the particular set of content that is provided to user 102 for enhanced content reviewing and reflection experience. Such commands may, for instance, be maintained and stored by a system, such as system 200*a* and/or as described above in reference to FIGS. 2A-2B, in association with one or more respective sets of content and one or more respective physical items, as indicated by information included in content repository 220 and/or item data 230.

Figure 4:
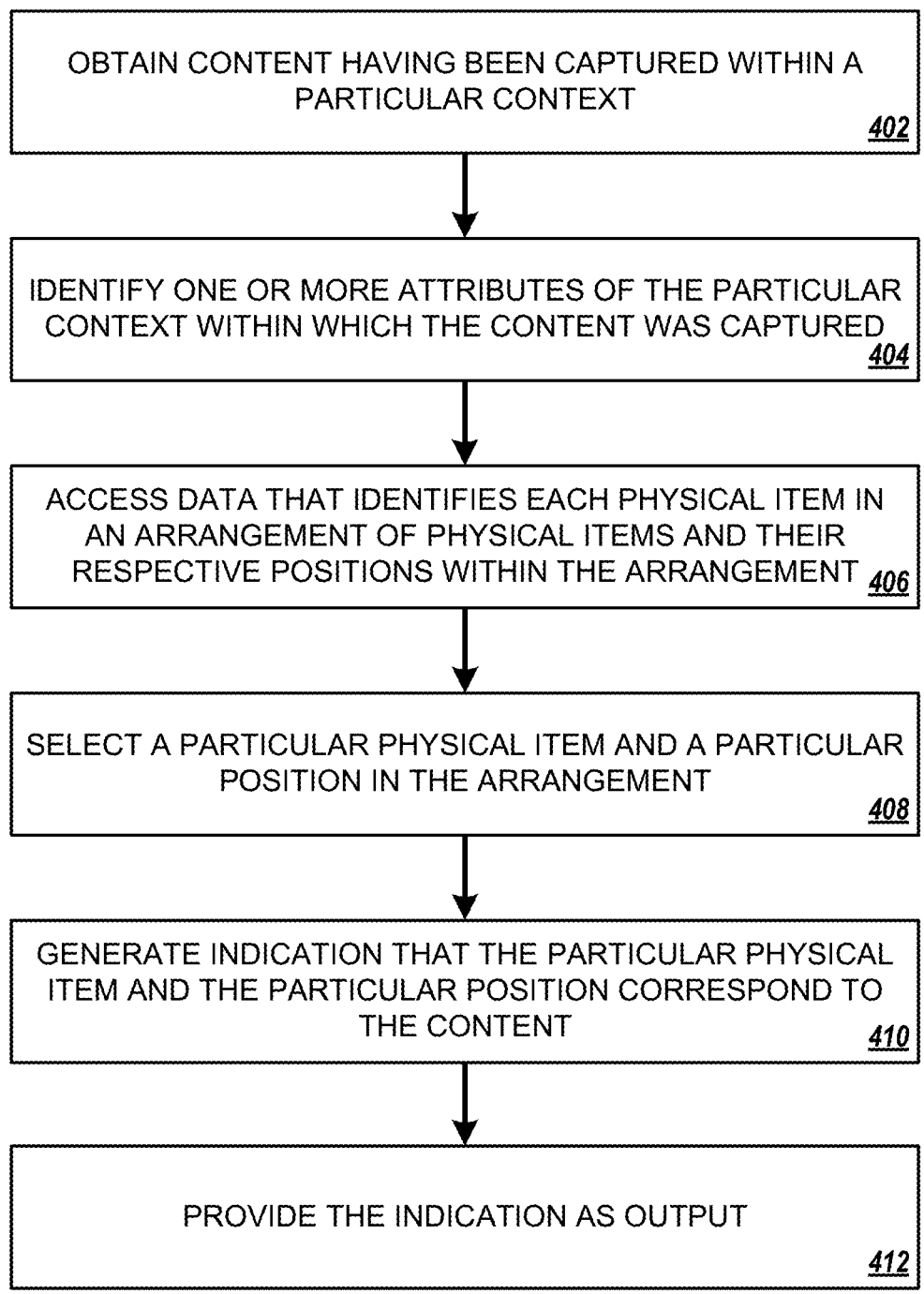
FIG. 4 is a flowchart of an example of a process for storing content in association with physical items.

FIG. 4 is a flowchart of an example of a process 400 for storing content in association with physical items. The following describes the process 400 as being performed by components of systems that are described with reference to FIGS. 1B and 2B. However, the process 400 may be performed by other systems or system configurations. Briefly, the process 400 may include obtaining content having been captured within a particular context (402), identifying one or more attributes of the particular context within which the content was captured (404), accessing data that identifies each physical item in an arrangement of physical items and their respective positions within the arrangement (406), selecting a particular physical item and a particular position in the arrangement (408), generating an indication that the particular physical item and the particular position correspond to the content (410), and provide the indication as output (412).

In more detail, the process 400 may include obtaining content having been captured within a particular context (402). For example, this may correspond to the content management module 210 receiving or otherwise obtaining new content 204 through one or more communication interfaces 201. Similarly, this may correspond to one or more computing devices of system 100*b*, as described above in reference to FIG. 1B, obtaining image 151 having been captured within the particular context 150.

The process 400 may include identifying one or more attributes of the particular context within which the content was captured (404). This may, for instance, correspond to the context identification module 212 identifying one or more attributes of the particular context within which content 204 was captured. Similarly, this may correspond to one or more computing devices of system 100*b*, as described above in reference to FIG. 1B, identifying one or more attributes of the particular context 150 within which the image 151 was captured by user device 106.

The process 400 may include accessing data that represents a particular arrangement of a set of physical objects including data that identifies (i) each physical item in the set of physical items and (ii) each position defined by the particular arrangement (406). For example, this may correspond to the content management module 210 accessing item data 230. Similarly, this may correspond to one or more computing devices of system 100*b*, as described above in reference to FIG. 1B, accessing data that represents a particular arrangement of a set of physical objects including data that identifies (i) each physical item in the set of physical items and (ii) each position defined by the particular arrangement in connection with presenting screen 108*h* through the application that is running on the user device 106.

The process 400 may include selecting, based at least on the one or more attributes of the particular context and the data that represents the arrangement of the set of physical objects, (i) a particular physical object from among the set of physical objects and (ii) a particular position from among the multiple positions defined by the particular arrangement (408). This may, for instance, correspond to the content-to-item mapping engine 214 of the content management module 210 mapping the new content 204 to a particular set of content stored in content repository 220 based at least on the one or more attributes identified by the context identification module 212 of the content management module 210 and data included in content repository 220 and/or item data 230, as described above in reference to FIG. 2B. Similarly, this may correspond to one or more computing devices of system 100*b*, as described above in reference to FIG. 1B, determining that the physical item that is representative of the car show is the physical item that is most likely to be associated with image 151 by user 102.

The process 400 may include generating an indication that the particular physical item and the particular position correspond to the content (410). For example, this may correspond to the content management module 220, as described above in reference to FIGS. 2A-2B, generating an indication that new content 204 is to be stored in association with a particular physical item located at a particular position as indicated in item data 230. Similarly, this may correspond to one or more computing devices of system 100*b*, as described above in reference to FIG. 1B, generating an indication that the physical item that is representative of the car show is the physical item that is most likely to be associated with image 151 by user 102.

The process 400 may include providing the indication as output (412). This may, for instance, correspond to the content management module 210, as described above in reference to FIGS. 2A-2B, providing, to one or more other components of system 200*a* or 200*b*, providing an indication that new content 204 is to be stored in association with a particular physical item located at a particular position as indicated in item data 230, such that new content 220 may be stored and maintained in content repository 220 in association with the particular physical item located at a particular position as indicated in item data 230. Similarly, this may correspond to one or more computing devices of system 100*b*, as described above in reference to FIG. 1B, presenting screen 108*h* to user 102 through the application that is running on the user device 106 and includes a user interface element 155 to suggest that user 102 associate image 151 with the particular physical item that is representative of the car show.

Figure 5A:
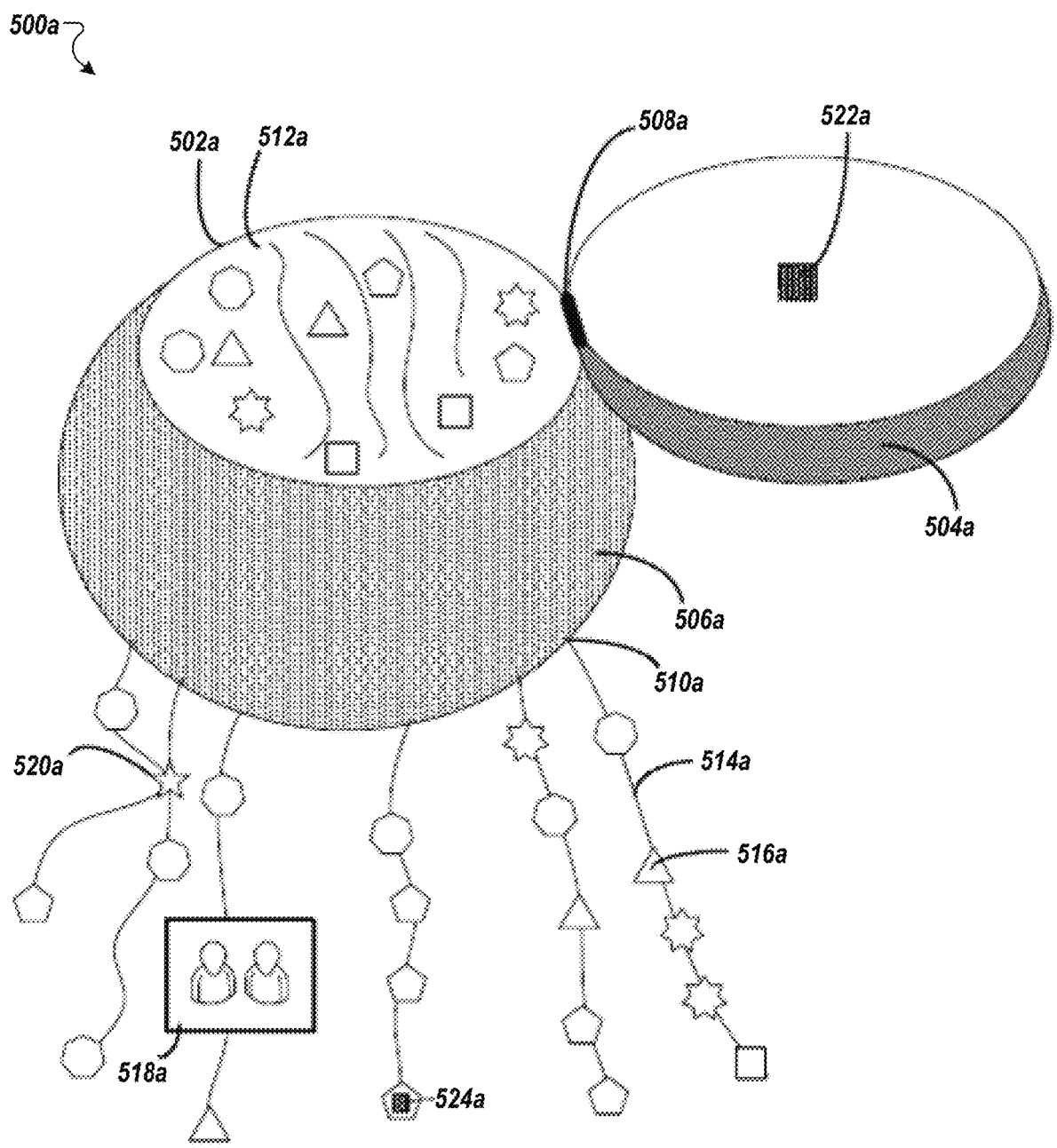
FIG. 5A is a perspective view of a base unit of an example of a physical, three-dimensional event log and display system.

FIG. 5A is a perspective view of a base unit of an example of a physical, three-dimensional event log and display system 500*a*. The physical, three-dimensional event log and display system 500*a* may, for instance, include an arrangement of physical items that are representative of different events, activities, and/or personal relationships in a manner similar to that of arrangement of physical items 130 as described above in reference to FIGS. 1A-4. In FIG. 5A, the physical, three-dimensional event log and display system 500*a* includes a base unit 502*a* including a top portion 504*a* and a bottom portion 506*a*. The top portion 504*a* may, for instance, be coupled to the bottom portion 506*a* through a fastening mechanism 508*a*. In some implementations, the fastening mechanism 508*a* may be a hinge mechanism. In other implementations, the fastening mechanism 508*a* may be a thread mechanism, a cap mechanism, or a magnetic fastening mechanism.

In some implementations, the base unit 502*a* may be substantially spherical. In such implementations, the top portion 504*a* and the bottom portion 506*a* may, for instance, be substantially hemispherical in shape. For example, the base unit 502*a* may be a sphere with a diameter between 7 and 8 inches.

In other implementations, the top portion 504*a* may be smaller or larger than the bottom portion 506*a* in volume or diameter. In these implementations, the top portion 504*a* or the bottom portion 506*a* may be substantially dome shaped.

In other implementations, the base unit 502*a* may be conical, cylindrical, cubical, pyramidal, annular, or capsule-shaped. In these implementations, the top portion 504*a* and the bottom portion 506*a* may be portions of a cone, a cylinder, a cube, a pyramid, an annulus, or a capsule.

The base unit 502*a* may, for instance, also include one or more attachment receptors 510*a*. In some examples, the attachment receptors 510*a* may be a latch, a clip, a thread attachment, an adhesive portion, a Velcro™ attachment, or a magnet. The base unit 502*a* may, in some instances, also include an inner cavity 512*a*. The inner cavity 512*a* may be a hollow portion within the base unit 502*a*. In some implementations, the inner cavity 512*a* may be in the top portion 504*a*. In other implementations, the inner cavity 512*a* may be in the bottom portion 506*a* or may encompass portions of the top portion 504*a* and the bottom portion 506*a*.

The base unit 502*a* may be composed of a polymeric material (e.g., polyvinyl chloride (PVC), polystyrene (PS), polyethylene, polyester, vinylester, epoxy, fiberglass, carbon fiber, or a composite of such materials), a metallic material (e.g., stainless steel, aluminum, metal alloys, or a composite of such materials), an organic material (e.g., wood-based material such as cardboard, paper, cork, plywood, or a composite combination), or a composite combination of polymeric, metallic, and/or organic material. In addition, a portion of the base unit 502*a* may be composed of fabric such as cotton or an elastomeric material such as natural rubber or latex.

The base unit 502*a* may, for example, be used as an art piece, a mobile, or a room adornment. When the base unit 502*a* is used as an art piece, the surface of the base unit 502*a* may, for example, serve as a blank canvas for a user to draw or decorate the base unit 502*a*, as a craft project.

The base unit 502*a* may, for example, be hung off the ceiling of an indoor area such as a child's playroom, a living room, a den, or a dorm room. The physical, three-dimensional event log and display system 500*a* may, in some examples, additionally include a resting stand. For instance, such a resting stand may be used to hold the base unit 502*a*. In some implementations, the base unit 502*a* may be placed on the resting stand in an office of the user.

The physical, three-dimensional event log and display system 500*a* may include one or more timeline cords 514*a* coupled to the base unit 502*a* through the attachment receptors 510*a*. In some examples, the timeline cords 514*a* may be composed of fabric such as cotton or nylon. In other examples, the timeline cords 514*a* may be composed of a polymeric material, a metallic material or alloy, or a composite of such materials. As illustrated in FIG. 5A, the timeline cords 514*a* may be coupled to the bottom portion 506*a* of the base unit 502*a* through the attachment receptors 510*a*. In other examples not shown in FIG. 5A, the timeline cords 514*a* may be coupled to the top portion 504*a* or a surface of the base unit 502*a*.

In some implementations, the timeline cords 514*a* may have a hollow opening in the interior of the cord running along the length of the cord. In other implementations, the timeline cords 514*a* may be a string without an interior hollow opening. Each of the timeline cords 514*a* can be seen as representing an acquaintance of the user or a period of time in the user's life.

In some implementations, the attachment receptors 510*a* may be evenly distributed along the bottom portion 506*a* of the base unit 502*a*. In these implementations, one of the timeline cords 514*a* may be coupled to one of the attachment receptors 510*a* and the timeline cords 514*a* may be allowed to hang loosely from the bottom portion 506*a* of the base unit 502*a*. In other implementations, two or more of the timeline cords 514*a* may be coupled to one of the attachment receptors 510*a*.

The physical, three-dimensional event log and display system 500*a* may include one or more physical items that are spatially arranged in positions that are associated with different contexts and thus different events, activities, and/or personal relationships, as described in more detail above in reference to FIGS. 1A-4. In the example of FIG. 5A, the one or more physical items may include one or more markers 516*a* that are coupled to timeline cords 514*a*. The one or more markers 516*a* may be seen as being spatially arranged in positions along the timeline cords 514*a* in an order that, when viewed as a whole, corresponds to the chronological order in which the respective events, activities, and/or personal relationships represented by markers 516*a* began and/or transpired. In this way, the markers 516*a*, as spatially positioned along timeline cords 514*a*, may be seen as being representative of a sort of timeline of events, activities, and/or personal relationships that are of relevance to the user of the physical, three-dimensional event log and display system 500*a*. In some implementations, system 500*a* may not include timeline cords 514*a*. In such implementations, the timeline markers 516*a* may, for example, be directly coupled to one another, or mutually attach to or abut a particular physical structure. Examples of such a particular physical structure may include an enclosure similar to that which has been described below in reference to FIG. 8, a magnetic structure, a wooden structure, a plastic structure, a garment or other textile article, and the like.

The timeline markers 516*a* may, for instance, include charms, pendants, badges, insignias, beads or other tangible accessories for commemorating an event or an acquaintance of the user of the physical, three-dimensional event log and display system 500*a*. The timeline markers 516*a* may, for example, be composed of a polymeric material, a metallic material, an organic material, or a composite combination. In general, the timeline markers 516*a* may be viewed as providing utility that is similar to the physical items described above in reference to FIGS. 1A-4.

The timeline markers 516*a* and/or the timeline cords 514*a* may, for instance, include a transparent sleeve 518*a*. In some implementations, the transparent sleeve 518*a* may be used to store a photo of the user or a photo of an acquaintance of the user. The transparent sleeve 518*a* may also be attached to one or more of the timeline markers 516a and/or the timeline cords 514a through a mechanical attachment, an adhesive, or a magnetic attachment. In addition, the transparent sleeve 518a may also be coupled directly to the base unit 502a.

The timeline markers 516a may, in some instances, be coupled to the timeline cords 514a or other timeline markers 516a through a mechanical attachment such as a clip, a latch, a safety pin, or a hook-and-loop fastening mechanism such as Velcro™. In other examples, the timeline markers 516a may be coupled to the timeline cords 514a or other timeline markers 516a through an adhesive such as a polymeric adhesive, an organic adhesive, or a synthetic adhesive. The timeline markers 516a may, in some examples, be coupled to the timeline cords 514a or other timeline markers 516a through a magnetic attachment. In these examples, the timeline cords 514a or the timeline markers 516a may be composed of a ferromagnetic material such as ferric oxide.

In some implementations, the timeline cords 514a may be detached from the base unit 502a. The inner cavity 512a of the base unit 502a may, in some instances, be configured to store the timeline cords 514a or the timeline markers 516a when detached from the base unit 502a. The timeline cords 514a and the timeline markers 516a may, in some instances, be stored in compartments in the inner cavity 512a. For example, the timeline cords 514a may be stored in a cord compartment and the timeline markers 516a may be stored in a marker compartment physically separated from the cord compartment.

The timeline cords 514a may also include a linking mechanism 520a for connecting one of the timeline cords 514a with another of the timeline cords 514a. In some implementations, the linking mechanism 520a may be one of the timeline markers 516a configured to couple to more than one of the timeline cords 514a. In other implementations, the linking mechanism 520a may be a mechanical attachment, an adhesive, or a magnetic attachment.

The linking mechanism 520a may, for instance, connect two or more timeline cords 514a together for representing a confluence or convergence of events, activities, or acquaintances. For example, the linking mechanism 520a may connect one of the timeline cords 514a representing a first acquaintance of the user with another one of the timeline cords 514a representing a second acquaintance of the user for signifying when the first acquaintance met the second acquaintance.

The physical, three-dimensional event log and display system 500a may also include a wireless communication reader and/or writer 522a including a radio frequency identification (RFID) or near field communication (NFC) reader and/or writer. In some examples, the wireless communication reader and/or writer 522a may be coupled to either the top portion 504a or the bottom portion 506a of the base unit 502a. In these and other examples, the wireless communication reader and/or writer 522a may be coupled to the inner cavity of the base unit 502a. The timeline markers 516a and/or timeline cords 514a may, in some implementations, include one or more wireless communication tags 524a including RFID or NFC tags. Such wireless communication tags 524a may, for instance, be embedded inside the timeline markers 516a or coupled to an outside surface of the timeline markers 516a and/or timeline cords 514a. Wireless communication tags 524a may be configured to communicate with the wireless communication reader and/or writer 522a or directly to a computing device or a mobile device outside of the physical, three-dimensional event log and display system 500a.

The wireless communication reader and/or writer 522a may also be physically and/or communicatively coupled to a controller unit and/or a communication interface. In this example, the controller unit and/or the communication interface may be coupled to the base unit 502a. The controller unit may, for example, be implemented as an integrated circuit, an application specific integrated circuit (ASIC), a chipset, a controller box, or a combination thereof. In addition, the communication interface may be implemented as a WiFi component, a Bluetooth™ component, or a combination thereof.

For example, the wireless communication reader and/or writer 522a coupled to the base unit 502a may read the wireless communication tags 524a coupled to the timeline markers 516a. In this example, the controller unit may interface with the wireless communication reader and/or writer 522a to determine the number of wireless communication tags 524a detected within a range of the wireless communication reader and/or writer 522a. In another example, the wireless communication tags 524a may be activated responsive to the timeline markers 516a being attached to the timeline cords 514a. In this example, the wireless communication reader and/or writer 522a may determine the number of wireless communication tags 524a attached to the timeline cords 514a.

In these and other examples, the wireless communication reader and/or writer 522a may interface with the controller unit and/or the communication unit to communicate data or information concerning the timeline markers 516a having the embedded wireless communication tags 524a to a computing device or a mobile device outside of the physical, three-dimensional event log and display system 500a.

In other examples, the controller unit and/or the communication unit may communicate data or information concerning the timeline markers 516a having the embedded wireless communication tags 524a to the user of the physical, three-dimensional event log and display system 500a directly through the base unit 502a. In these and other examples, the base unit 502a may include a display screen such as a liquid crystal display (LCD), a light emitting diode (LED) display, or a combination thereof.

In some implementations, the base unit 502a may also include a mutable structure configured to change the shape of the base unit 502a in response to one or more of the timeline cords 514a attaching to the base unit 502a, one or more of the timeline markers 516a attaching to the timeline cords 514a, or a combination thereof. Such a mutable structure may receive data, such as arrangement update data as described above in association with FIG. 2B, and, in response, make one or more modifications to the physical shape/arrangement of the physical items of system 500a. The mutable structure may, for instance, include an adjustable support of the base unit 502a including an adjustable frame or an adjustable strut of the base unit 502a. In some examples, the mutable structure includes a collapsible support, a telescoping support, a foldable support, or a combination thereof.

The base unit 502a may, for example, initially be spherical in shape. In such implementations, system 500a may employ logic to make one or more determinations regarding the current state of the mutable structure, whether criteria for structure mutation has been satisfied, states into which the structure is to mutate, and the like. In the example in which the base unit 502a initially takes on a spherical form, the shape of the base unit 502a may change to an oval shape in response to determining, by one or more computing devices operating in association with system 500a, that one or more of the timeline cords 514a are attached or are currently being attached to the base unit 502a. In addition, the shape of the base unit 502a may change in response to determining, by one or more computing devices operating in association with system 500a, that a particular quantity of timeline markers 516a are coupled or are currently being coupled to the timeline cords 514a.

Figure 5B:
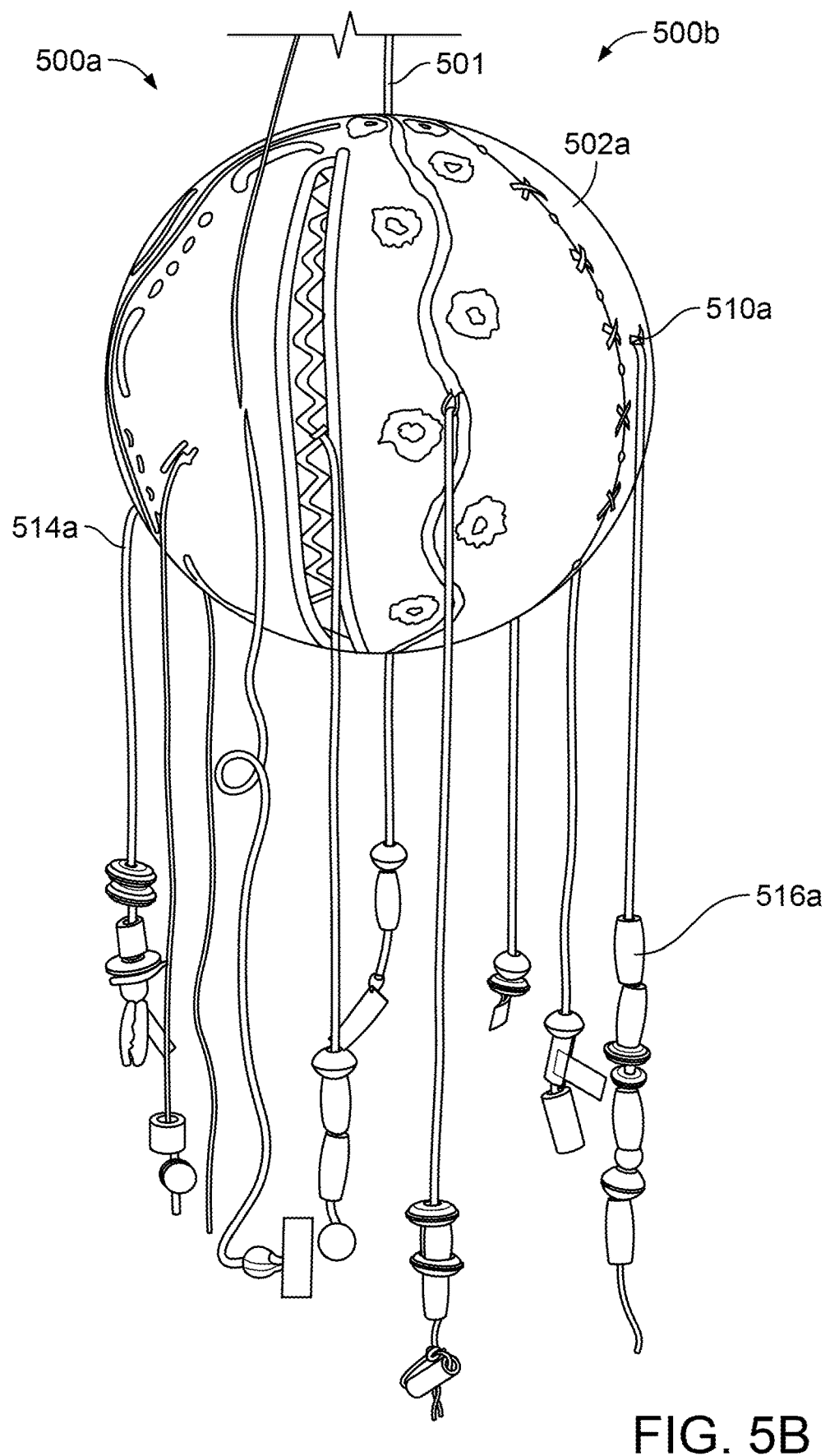
FIG. 5B is a system view of the physical, three-dimensional event log and display system as it might look in operation.

FIG. 5B is a system view 500b of the physical, three-dimensional event log and display system 500a as it might look in operation. As previously mentioned above in reference to FIG. 5A, the physical, three-dimensional event log and display system 500a may include an arrangement of physical items that are representative of different events, activities, and/or personal relationships in a manner similar to that of arrangement of physical items 130 as described above in reference to FIGS. 1A-4. As illustrated in FIG. 5B, the base unit 502a may, for example, be attached to a surface, such as a ceiling or a wall, through a string component 501 or one of the timeline cords 514a. In some implementations, the string component 501 can be a polymeric or metallic string coupled to the base unit 502a through one or more of the attachment receptors 510a at one end and coupled to an attachment mechanism on the surface at the other end. In other implementations, the base unit 502a may be attached to the surface using one or more of the timeline cords 514a.

For illustrative purposes, the physical, three-dimensional event log and display system 500a is shown in FIG. 5B with one base unit 502a, although it should be understood that the physical, three-dimensional event log and display system 500a may include two or more of base units 502a coupled to one another. In some examples, a first base unit 502a can be coupled to a ceiling of a room. In these examples, a second base unit 502a can be coupled to the first base unit 502a through one or more string components 501 coupled to the attachment receptors 510a on the surface of the first base unit 502a. Also, in such examples, a third base unit 502a can be coupled to either the first base unit 502a or the second base unit 502a through one or more string components 501 coupled to the attachment receptors 510a on the surface of either the first base unit 502a or the second base unit 502a.

Also, for illustrative purposes, the physical, three-dimensional event log and display system 500a is shown as including a base unit 502a and one or more timeline makers 516a coupled to one or more timeline cords 514a coupled to the base unit 502a, although it should be understood that the timeline markers 516a may be coupled directly to one another and to the base unit 502a without the timeline cords 514a.

Figure 5C:
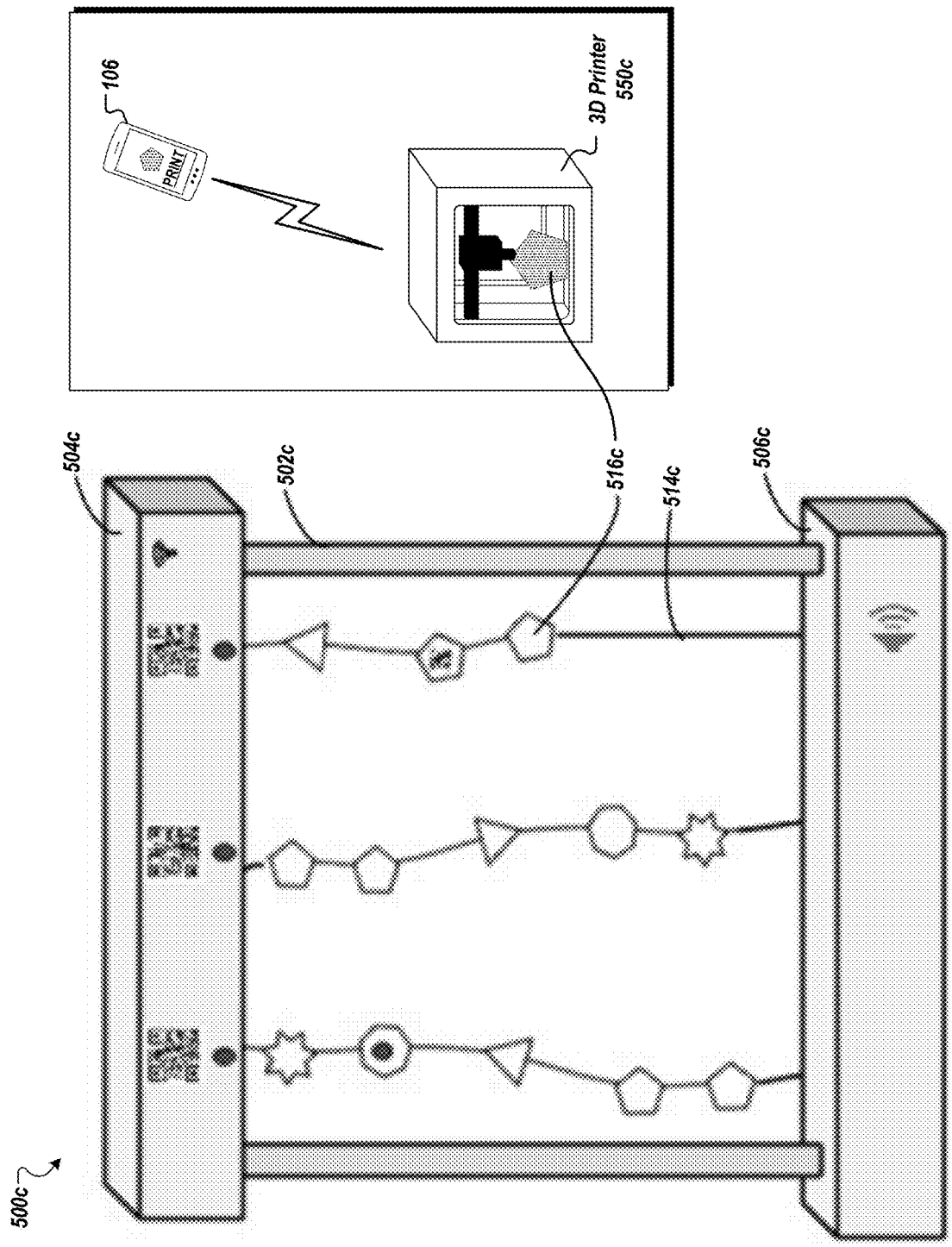
FIG. 5C is a perspective view of another example of a physical, three-dimensional event log and display system.

FIG. 5C is a perspective view of another example of a physical, three-dimensional event log and display system 500c. The physical, three-dimensional event log and display system 500c may, for instance, include an arrangement of physical items that are representative of different events, activities, and/or personal relationships in a manner similar to that of arrangement of physical items 130 as described above in reference to FIGS. 1A-4. In some examples, the physical, three-dimensional event log and display system 500c may be considered to represent other implementations of the features of the physical, three-dimensional event log and display system 500a as described above in reference to FIGS. 5A-5B. As illustrated in FIG. 5C, the base unit 502c may include a substantially rectangular top portion 504c coupled to a substantially rectangular bottom portion 506c by one or more columnar risers.

The base unit 502c, the timeline markers 516c and/or timeline cords 514c may, in the example of FIG. 5C, include a visual scan code or a wireless communication component for providing additional information and photos of events shared together concerning the milestones, events, or achievements signified by the timeline cords 514c and/or the timeline markers 516c. The visual scan code or wireless communication component may, for example, be read by one or more of the devices described above in reference to FIGS. 1A-4, as well as other mobile devices, wearable devices, and/or computing devices.

Also, as illustrated in FIG. 5C, the timeline markers 516c may, for example, be printed by a 3D printer 550c based on designs provided by an online source or depository. In some implementations, collections of designs for timeline markers may be presented for user selection through one or more websites or applications that run on client devices. For example, a user may be able to select designs for the timeline markers 516c through interacting with an application that is running on a client device, such as user device 106 described above in reference to FIGS. 1A-4, and transmit a message to one or more entities requesting 3D-printed versions of the selected designs for the timeline markers 516c. Upon receipt of such a message, the one or more entities may print the requested designs using a 3D printer, such as 3D printer 500c, and ship the newly-minted timeline markers out for delivery to the requesting user.

As indicated previously, the timeline markers 516c, the timeline cords 514c, and/or the base unit 502c may, in some instances, also include one or more LEDs or phosphorescent components. For example, the LEDs and/or phosphorescent components may allow the timeline markers 516c, the timeline cords 514c, and/or the base unit 502c to glow or emit lights of different wavelengths when the base unit 502c is placed in a darkened or low-light environment. The base unit 502c and/or the timeline markers 516c and/or the timeline cords 514c may also emit sounds, including prerecorded messages, music, or sound effects.

Figure 5D:
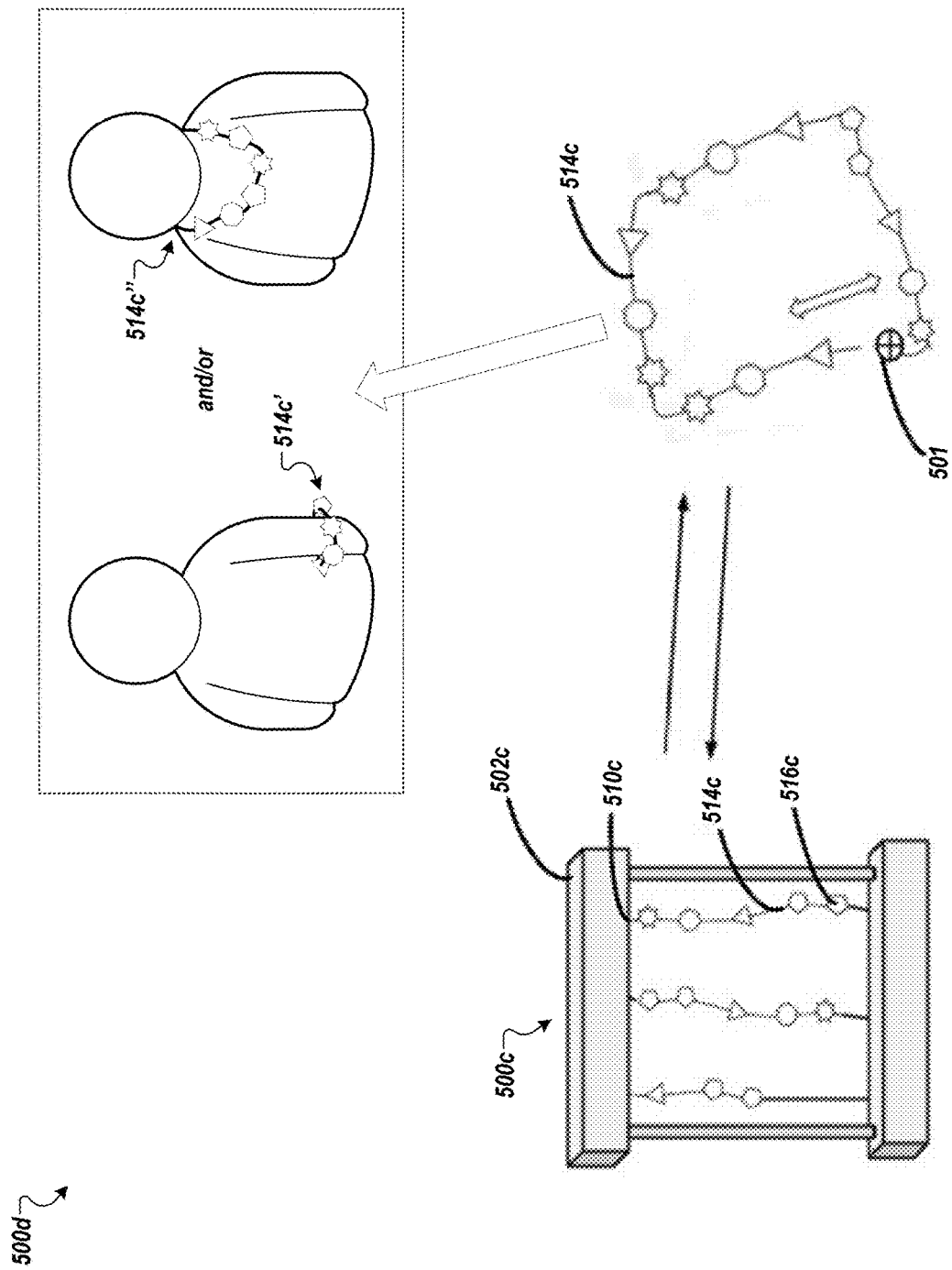
FIG. 5D illustrates alternative uses for timeline cords of physical, three-dimensional event log and display systems.

FIG. 5D illustrates alternative uses 500d for timeline cords of physical, three-dimensional event log and display systems. In this example, such physical, three-dimensional event log and display systems may include system 500c as described above in reference to FIG. 5C, which may include an arrangement of physical items that are representative of different events, activities, and/or personal relationships in a manner similar to that of arrangement of physical items 130 as described above in reference to FIGS. 1A-4. As depicted in FIG. 5D, the timeline cords 514c may include a clasping mechanism 501 used to couple one end of the timeline cord 514c with another end of the timeline cord 514c. The clasping mechanism 501 may be configured to secure one or more of the timeline cords 514c around a wrist or a neck of the user when one or more of the timeline cords 514c is detached from the base unit 502c.

In the example of FIG. 5D, one of the timeline cords 514c is detached from the attachment receptors 510c of the base unit 502c such that it may be worn by a user for personal adornment. For example, a detached one of the timeline cords 514c may be wrapped the wrist of a user such that it is worn as a bracelet 514c', or may be draped around the neck of a user such that it is worn as a necklace 514c". In this way, timeline cords 514c may serve as keepsake necklaces and/or charm bracelets, with the timeline markers 516c attached to such timeline cords 514c serving as the respective keepsakes and/or charms.

Figure 6A:
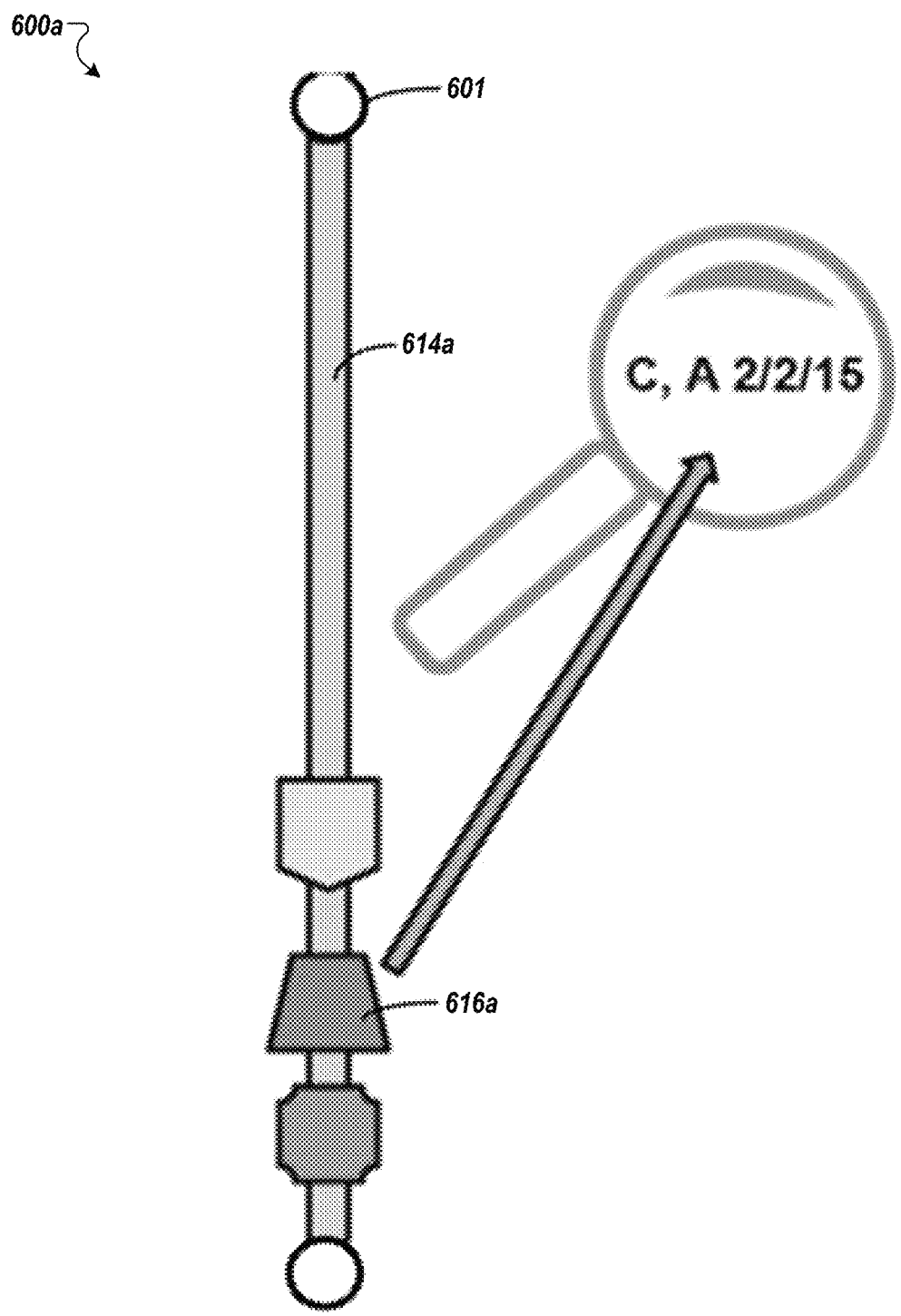
FIG. 6A is a front elevational view of timeline markers coupled to a timeline cord.

FIG. 6A depicts a front elevational view 600a of timeline markers 616a coupled to one of the timeline cords 614a. The timeline cords 614a may include a host cord or a guest cord. A user may, for example, attach or affix timeline markers 616a to the host cord to commemorate an event or achievement in the life of the user. A user may also permit a guest or acquaintance of the user to attach or affix timeline markers 616a to the host cord, the guest cord, or a combination thereof to represent a shared event or a shared achievement in the lives of both the user and the guest or acquaintance.

The timeline cords 614a may include a clasping mechanism 601. The clasping mechanism 601 may be coupled to an end of one of the timeline cords 614a. The clasping mechanism 601 may be configured to secure one or more of the timeline cords 614a around a wrist or neck of the user when one or more of the timeline cords 614a is detached from a base unit, such as base unit 502a or 502c as described above in reference to FIGS. 5A-5D.

As illustrated in FIG. 6A, the timeline markers 616a may, for example, include a camping marker, a 10K run marker, a horseback riding award marker, a first spelling bee marker, or a visit from a grandparent marker. The timeline markers 616a may include a letter or number indicating a name or identifier of an acquaintance of the user. The letters or numbers may, in some instances, be printed on the timeline markers 616a.

The base unit 502a or 502c, the timeline markers 616a and/or the timeline cords 614a may also include a visual scan code including a quick response (QR) code, a barcode, a scan code, or other matrix codes printed or etched onto the timeline markers 616a and/or the timeline cords 614a. In some implementations, the visual scan code may be scanned by a mobile device of a user or an acquaintance of the user to provide additional information and photos of events shared together concerning the milestones, events, or achievements signified by the timeline markers 616a. Information attributed to particular events may, for example, include an event theme, an event frequency, an event duration, or combination thereof.

The timeline markers 616a and/or the timeline cords 614a may, in some examples, also include an LED and/or phosphorescent component. The LED or phosphorescent component may allow the timeline markers 616a and/or the timeline cords 614a to glow or emit lights of different wavelengths when the base unit 502a or 502c is placed in a darkened or low-light environment. The timeline markers 616a, the timeline cords 614a and/or the base unit 502a or 502c may, in some instances, also emit sounds through a speaker embedded in the timeline markers 616a, the base unit 502a or 502c, and/or coupled to the timeline cords 614a, including prerecorded messages, music, or sound effects, when coupled to other timeline markers 616a or the timeline cords 614a.

The base unit 502a or 502c timeline markers 616a and/or the timeline cords 614a may also include a flash or solid-state memory unit or chip capable of being read and written to by a computing device, a tablet device, a mobile device, and/or a laptop. The flash, solid-state memory unit and/or chip(s) may communicate wirelessly and/or through a universal serial bus (USB) interface.

The timeline markers 616a and/or the timeline cords 614a may, in some examples, generate haptic or tactile feedback responsive to a user physically contacting the timeline markers 616a, as detected by one or more sensing elements that are physically and/or communicatively coupled to the timeline markers 616a and/or the timeline cords 614a. In some of such examples, the timeline markers 616a may generate haptic feedback when the timeline markers 616a are coupled to one another or a timeline cord 614a in a specific configuration or order. In other of such examples, the timeline markers 616a may generate a haptic feedback when the timeline markers 616a are in a bracelet or necklace configuration as depicted in FIG. 5D, and when the timeline markers 616a receive a wireless signal from an external source.

The timeline cords 614a may also include a goal cord and/or base unit 502a or 502c including multiple breakable chads for indicating a progression or partial achievement of a goal set by the user. The breakable chads can be embedded in the timeline markers 616a or along the length of a timeline cord 614a.

Figure 6B:
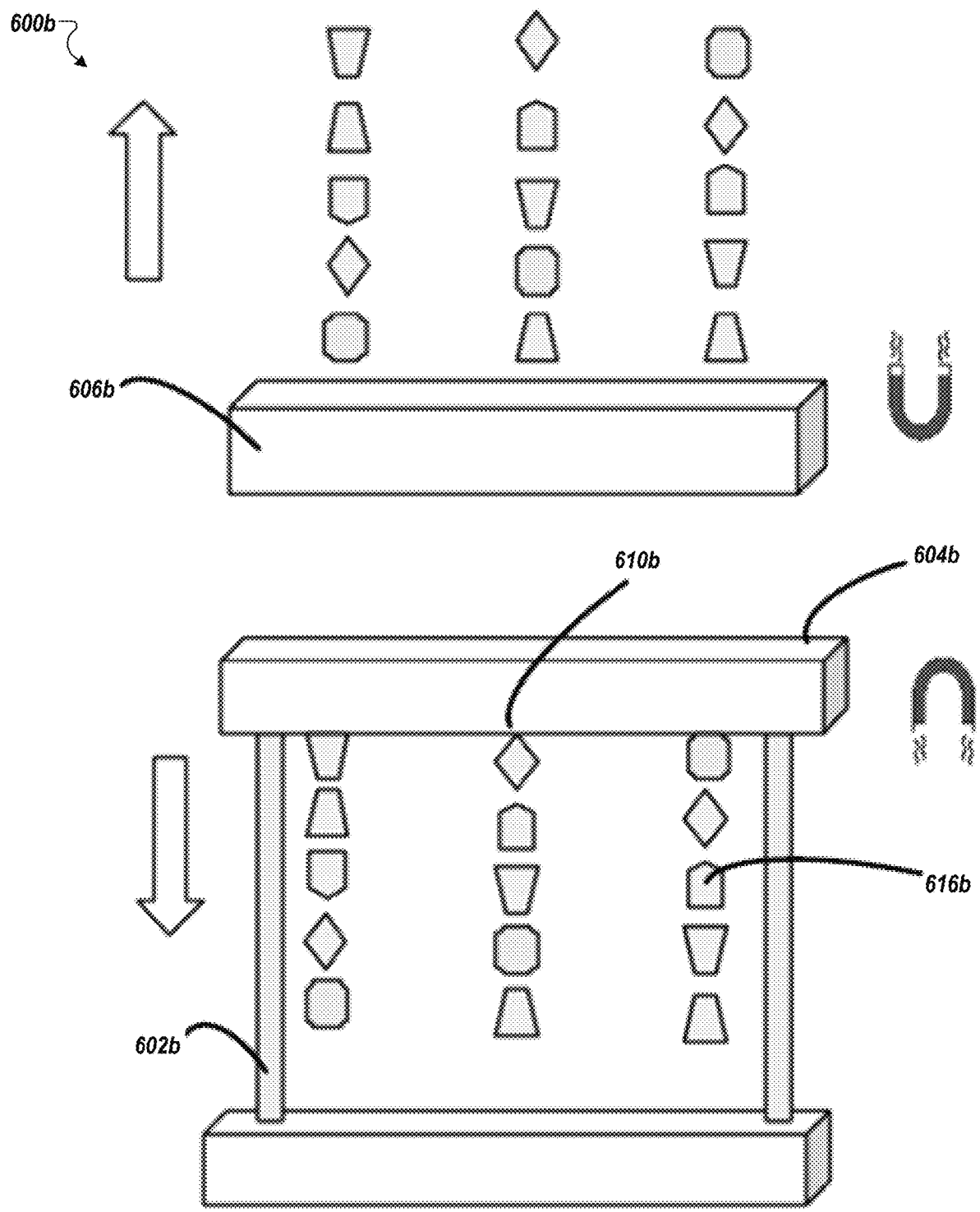
FIG. 6B is a perspective view of an example of a physical, three-dimensional event log and display system that includes magnetic timeline markers.

FIG. 6B is a perspective view 600b of an example of a physical, three-dimensional event log and display system that includes magnetic timeline markers 616b. As previously indicated, the magnetic timeline markers 616b may be composed of a ferromagnetic material such as ferric oxide. As illustrated in FIG. 6B, the timeline markers 616b may be coupled directly to the bottom portion 606b of the base unit 602b. In the example of FIG. 6B, the magnetic timeline markers 616b may be stacked on top of one another to form one or more timelines without timeline cords 514, as described above in reference to FIGS. 5A-5D.

In some implementations, the timeline markers 616b may be coupled to the top portion 604b of the base unit 602b. In these implementations, the attachment receptor 610b may be implemented as a ferromagnetic metal such as iron, nickel, cobalt, or an alloy or combination thereof. Also, in these implementations, the timeline markers 616b may hang from the top portion 604b of the base unit 602b through magnetic attachments without the use of the timeline cords 514.

Figure 7:
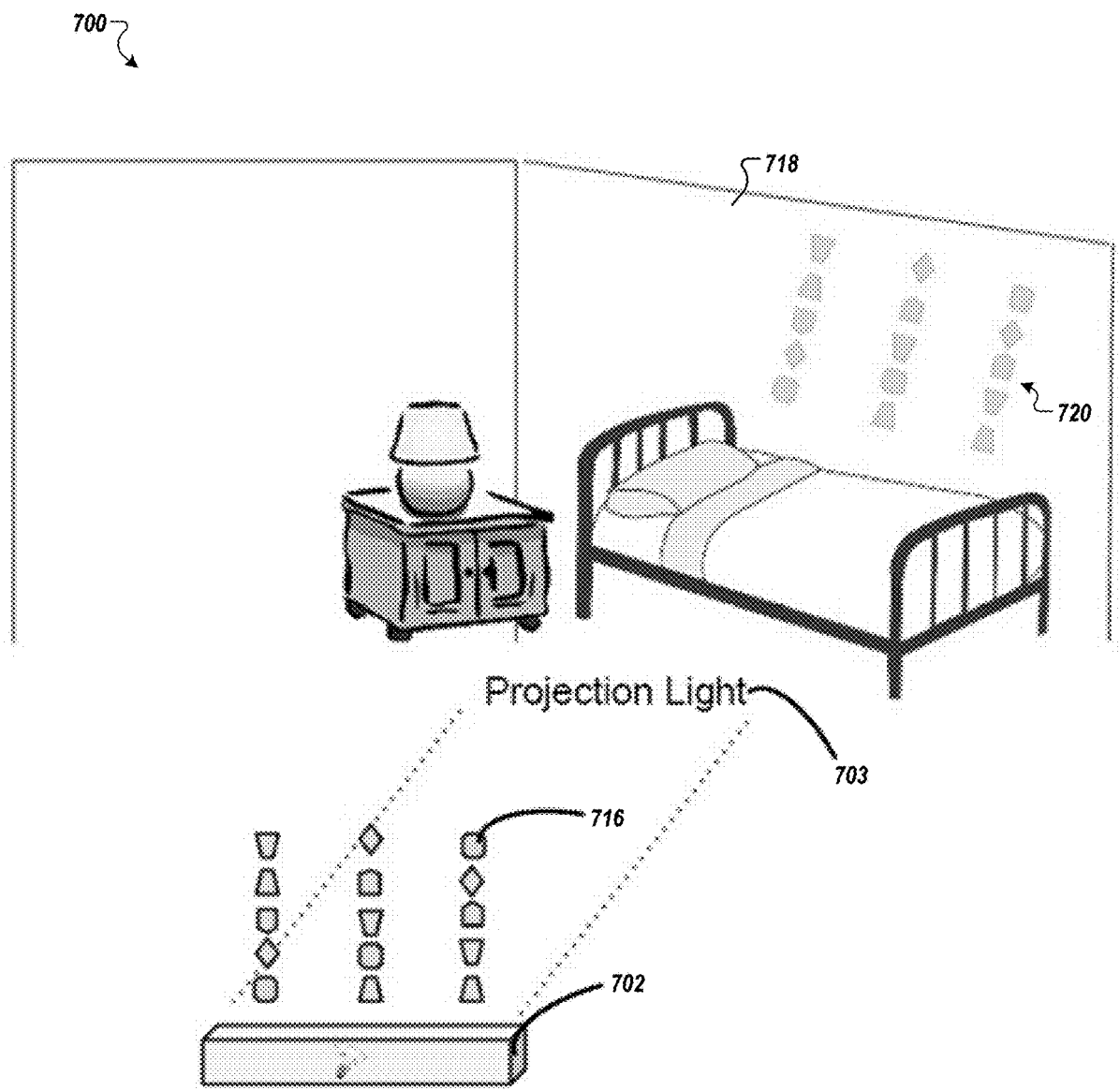
FIG. 7 is a system view of an example of a physical, three-dimensional event log and display system that includes a projection mechanism.

FIG. 7 is a system view of an example of a physical, three-dimensional event log and display system 700 that includes a projection mechanism. The physical, three-dimensional event log and display system 700 may include a light-emitting component embedded in the base unit 702. The light-emitting component may, for example, be implemented as an LED, a compact fluorescent light emitter, a video projection element or combination thereof. The light emitting component may, for instance, generate or project a light 703, a photograph and/or a video outward from the inside of the base unit 702. Also, when the base unit 702 is placed in a darkened or low-light environment, such as a darkened room or at night time, the light 703 projected by the light emitting component may cast a shadow or silhouette 720 of the timeline markers 716, timeline cords 514 as described above in reference to FIGS. 5A-5D, transparent sleeve 518a as described above in reference to FIG. 5A-5B, a photograph, a video or a combination thereof on a surface 718, such as a wall or screen.

By casting a shadow or silhouette 720 of the timeline markers 716, the timeline cords 514, or a combination thereof on the surface 718, the physical, three-dimensional event log and display system 700 may remind a user of the events, achievements or personal relationships experienced by the user through a static or dynamic shadow projection. By projecting a photograph and/or a video, including content that may be referenced by and/or stored within the timeline markers 716, the physical, three-dimensional event log and display system 700 may remind a user of events, achievements or personal relationships experienced by the user.

For example, the user may be a child going to bed in the child's room. In this example, a parent or child may turn off the lights in the child's room and also turn on the light emitting component in the base unit 702. By doing so, a shadow or silhouette 720 of the timeline markers 716, the timeline cords 514, or a combination thereof is projected onto the walls of the child's room and the child can reminisce about the real-life events, accomplishments, or personal relationships represented by the shadow or silhouette projections 720 of the timeline markers 716.

In some examples, the physical, three-dimensional event log and display system 700 may be played as a game where the base unit 702, and/or the timeline cords 514 serve as the game boards and the timeline markers 716 serve as game pieces.

Figure 8:
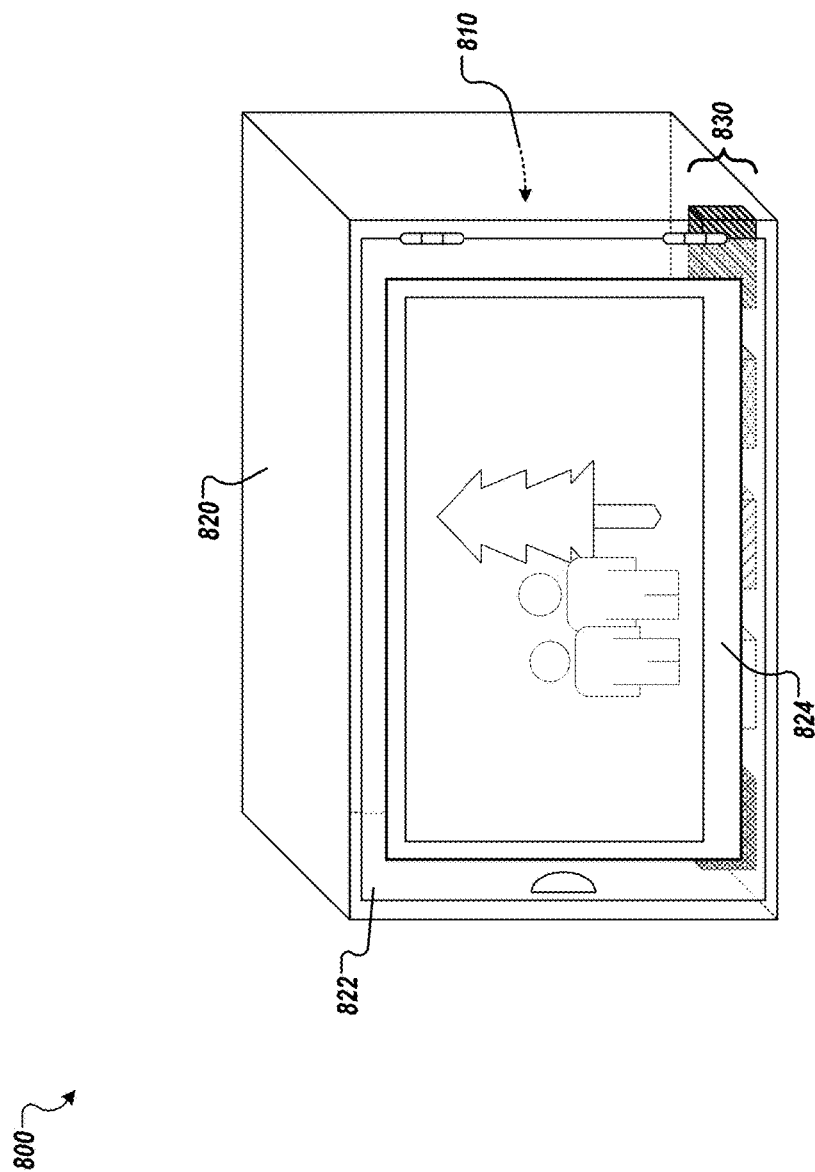
FIG. 8 illustrates an example of an enclosure for housing one or more physical items, any of which may be associated with content.

FIG. 8 illustrates an example of an enclosure 800 for housing one or more physical items that are associated with content. The enclosure 800 may, for instance, include an inner cavity 810 surrounded by one or more outer surfaces 820. An arrangement of physical items 830 may be stored inside of enclosure 800 within the space of inner cavity 820.

In some examples, the enclosure 800 may include a door 820 that provides access to the arrangement of physical items 830. The door 820 may, in some implementations, include a slot, a cavity, or one or more lips for holding or securing an image 824 or other document. In this way, a user of enclosure 800 may place an image 824 within door 822 that commemorates the events, activities, and/or personal relationships represented by one or more of the physical items in the arrangement of physical items 830.

In some implementations, one or more of the outer surfaces 820 may be at least partially transparent or translucent. In this way, one or more of the physical items of the arrangement of physical items 830 may be seen from outside the enclosure 800. In some implementations, the enclosure 800 may serve as the housing for a diorama of physical items 830. In some examples, an enclosure similar to that of enclosure 800 may be ordered by and provided to a user through one or more processes similar to the process of ordering 3D printed items as described above in reference to FIGS. 1B and 5C. In some examples, the enclosure 800 may include one or more pegs or mounting structures on one or more of the outer surfaces 820 such that the enclosure 800 may be physically mated or connected with another enclosure that is similar to enclosure 800.

In some examples, the enclosure 800 may, itself, serve as a physical item that is representative of an experience such as an event, activity, and/or personal relationship. In such examples, a computing device, such as user device 106 described above in reference to FIGS. 1A-2B, may be able to capture or otherwise obtain information about the enclosure 800 through communicating with a wireless communication component of enclosure 800, performing image recognition on or more images of enclosure 800, and the like. In this way, the enclosure 800 can be seen as serving as a sort of surrogate marker for unregistered/unidentifiable physical items and objects that are contained in the inner cavity 810 of enclosure 800. This may, for instance, allow users to indirectly associate physical items of commemorative value with events, activities, and/or personal relationships, by simply placing them inside enclosure 800. In some of such examples, the enclosure 800 may be representative of one or more high-level events, activities, and/or personal relationships, with one or more of the physical items 830 representing lower-level events, activities, and/or personal relationships. For example, the enclosure 800 may be representative of a romantic relationship between two persons, while physical items 830 contained within enclosure 800 are representative of different dates that the two persons went on together.

Figure 9:
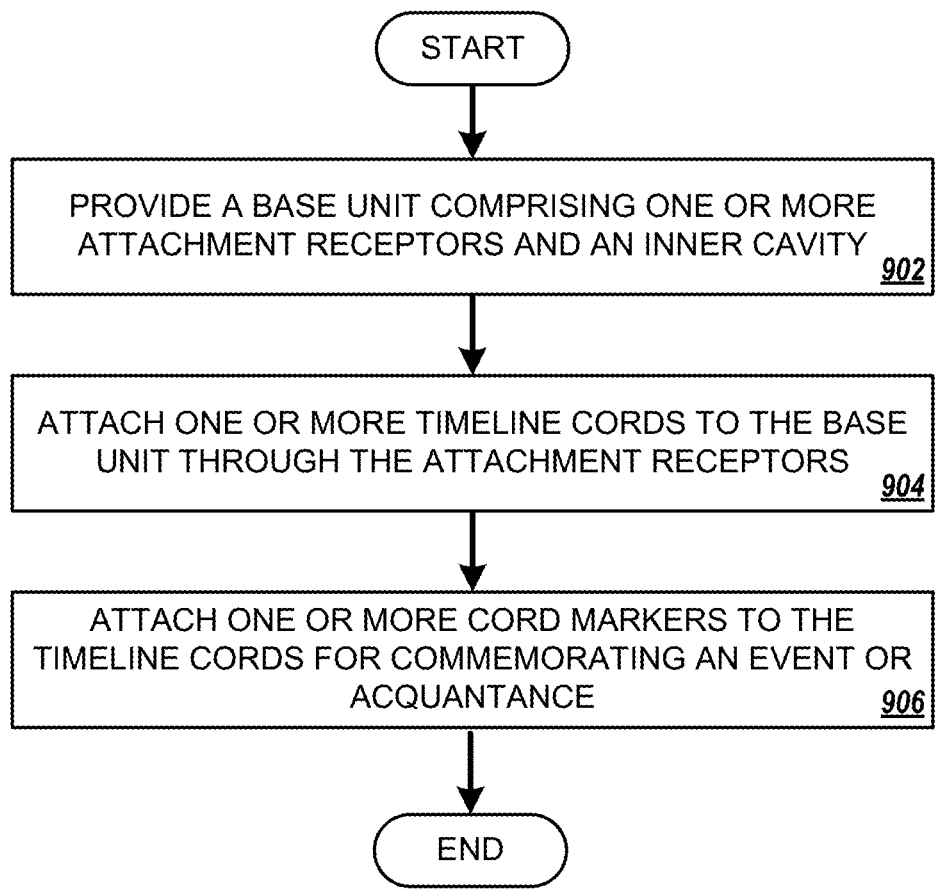
FIG. 9 is an example of a method of operation of physically logging and displaying personal event data, according to one embodiment.

Reference is now made to FIG. 9, which is an example of a method 900 of operation of physically logging and displaying personal event data, according to one embodiment. The following describes the method 900 as being performed by one or more entities in providing and operating the physical, three-dimensional event log and display systems described herein. Briefly, the method 900 may include providing a base unit including one or more attachment receptors and an inner cavity (902), attaching one or more timeline cords to the base unit through the attachment receptors (904), and attaching one or more timeline markers to the timeline cords for commemorating an event or acquaintance (906).

In more detail, the method 900 may include providing a base unit including one or more attachment receptors and an inner cavity (902). For example, this may correspond to providing a base unit 502a or 502c including one or more attachment receptors 510 and an inner cavity 512, as described above in reference to FIGS. 5A-5D.

The method 900 may include attaching one or more timeline cords to the base unit through the attachment receptors (904). This may, for instance, correspond to attaching one or more timeline cords 514 to the base unit 502a or 502c through the attachment receptors 510, as described above in reference to FIGS. 5A-5D.

The method 900 may include attaching one or more timeline markers to the timeline cords for commemorating an event or acquaintance (906). For example, this may correspond to attaching one or more cord markers 516 to the timeline cords 514, as described above in reference to FIGS. 5A-5D, for commemorating an event or acquaintance.

In some examples, the base unit may include a top portion and a bottom portion coupled to the top portion through a fastening mechanism. This may, for instance, correspond to base unit 502a described above in reference to FIGS. 5A-5B as including a top portion 504a and a bottom portion 506a that is coupled to the top portion 504a through a fastening mechanism 508a, such as a thread mechanism, a cap mechanism, or a magnetic fastening mechanism.

In some implementations, the inner cavity may be configured to store the timeline cords or the timeline markers. For example, this may correspond to the inner cavity 512a of the base unit 502a, as described above in reference to FIGS. 5A-5B, being configured to store the timeline cords 514a or the timeline markers 516a when detached from the base unit 502a.

In some examples, the base unit may be configured to attach to a surface through a string component or one of the timeline cords. This may, for instance, correspond to base unit 502a described above in reference to FIG. 5B as being attachable to a surface, such as a ceiling or a wall, through a string component 501 or one of the timeline cords 514a.

In some implementations, the method 900 may further include attaching a wireless communication reader, writer, or a combination thereof to the base unit. For example, this may correspond to attaching wireless communication reader and/or writer 522a to base unit 502a, as described above in reference to FIGS. 5A-5B. In some of such implementations, the timeline markers may include one or more wireless communication tags configured to communicate with the wireless communication reader, writer, or a combination thereof. This may, for instance, correspond to timeline markers 516a and/or timeline cords 514a described above in reference to FIGS. 5A-5B as including one or more wireless communication tags 524a that are configured to communicate with the wireless communication reader and/or writer 522a.

In some examples, the timeline cords may include a linking mechanism for connecting one of the timeline cords with another of the timeline cords. For example, this may correspond to the timeline cords 514a, as described above in reference to FIGS. 5A-5B, including a linking mechanism 520a, such as a mechanical, adhesive, or magnetic attachment for connecting one of the timeline cords 514a with another of the timeline cords 514a.

In some implementations, the base unit may include a mutable structure configured to change a shape of the base unit in response to the timeline cords attaching to the base unit, the timeline markers attaching to the timeline cords, or a combination thereof. This may, for instance, correspond to the base unit 502a, as described above in reference to FIG. 5A, including a mutable structure configured to change the shape of the base unit 502a in response to one or more of the timeline cords 514a attaching to the base unit 502a, one or more of the timeline markers 516a attaching to the timeline cords 514a, or a combination thereof.

In some examples, the timeline cords may include a clasping mechanism for securing one or more of the timeline cords around a wrist or a neck of a user when one or more of the timeline cords is detached from the base unit. For example, this may correspond to the timeline cords 514c, as described above in reference to FIGS. 5C-5D, including a clasping mechanism 501 used to couple one end of the timeline cord 514c with another end of the timeline cord 514c, so as to form bracelet 514c' and/or necklace 514c" for personal adornment.

In some implementations, the method 900 may further include projecting a light, a photograph, a video, or a combination thereof from a light projecting component coupled to the inner cavity of the base unit at the timeline cords, the timeline markers, or a combination thereof. This may, for instance, correspond to the light emitting component of the physical, three-dimensional event log and display system 700, as described above in reference to FIG. 7, generating or projecting a light 703, a photograph and/or a video outward from the inside of the base unit 702.

Figure 10:
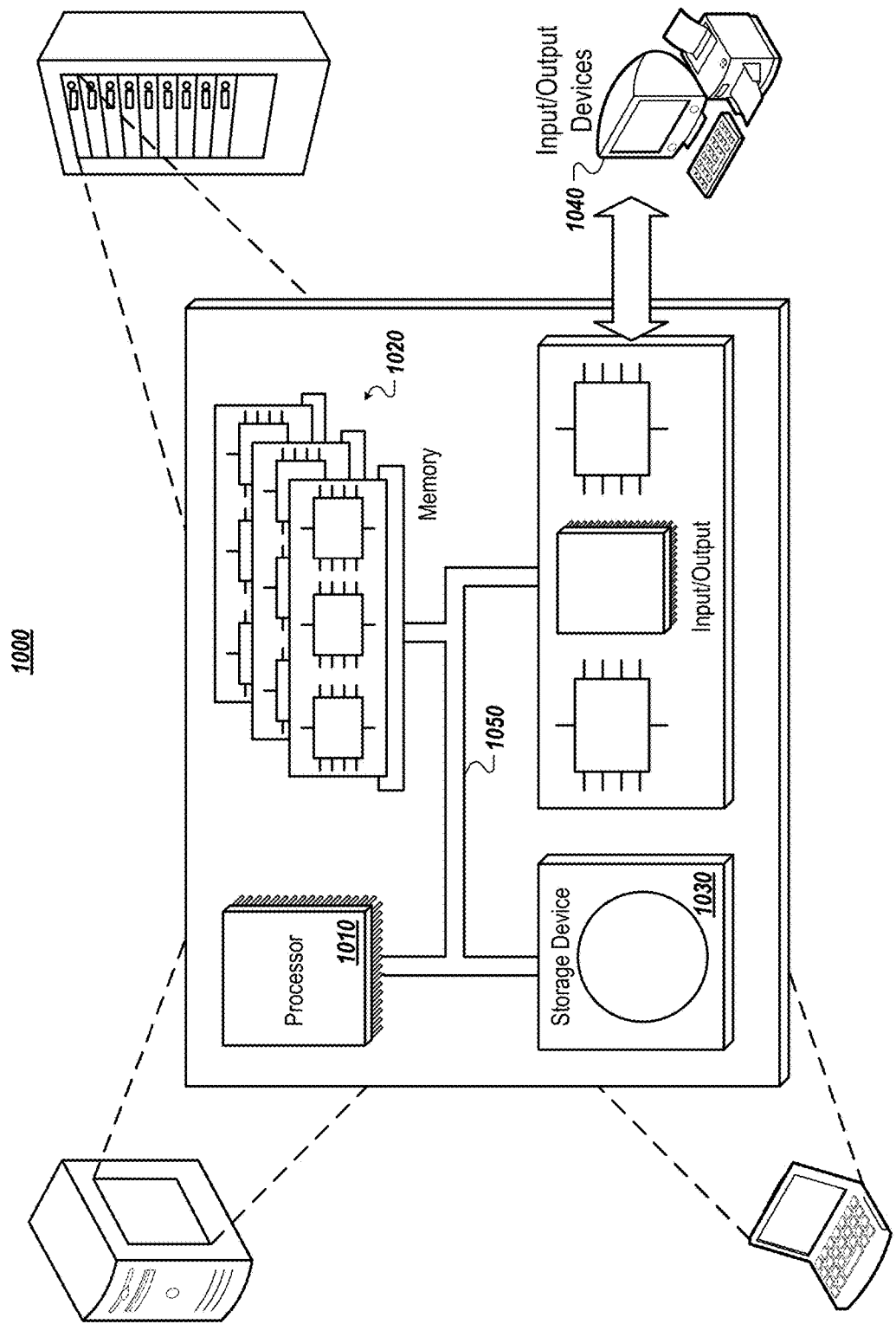
FIG. 10 is a diagram of examples of computing devices.

FIG. 10 is a diagram of examples of computing devices in a system 1000. The system 1000 can be used for the operations described in association with FIGS. 1-9 according to some implementations. The system 1000 may include system 100a, 100b, 200a, and/or 200b, may perform process 300 and/or 400, may operate in conjunction with systems described above in reference to FIGS. 5A-8, and may at least partially enable the performance of process 900.

The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The storage device 1030 is capable of providing mass storage for the system 1000. In one implementation, the storage device 1030 is a computer-readable medium. In various different implementations, the storage device 1030 may be a floppy disk device, a hard disk device, an optical disk device, or a tape device.

The input/output device 1040 provides input/output operations for the system 1000. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
   storing multiple sets of content that each (i) include content having been captured within a different context and (ii) correspond to a different physical item in a set of physical items, wherein the set of physical items are spatially arranged in positions that are associated with the different contexts within which the multiple sets of content were captured, comprising storing an item of media content that is retrieved, for output, when an image of a particular physical item arranged in a predefined arrangement among one or more other physical items of the set is obtained;
   obtaining, using a camera, a first image of the physical item arranged in a different arrangement among the one or more other physical items;
   determining each of the positions in which one or more physical items in the set of physical items are spatially arranged, comprising determining, based on the first image of the physical item arranged in the different arrangement among the one or more other physical items, a difference between the different arrangement and the predefined arrangement;
   generating a command to spatially arrange the one or more physical items in each of the one or more determined positions, comprising generating a command for an electromechanical device to rearrange the physical item or the one or more other physical items from the different arrangement to the predefined arrangement based at least on the difference, wherein commands associated with each file or piece of content are maintained by a computing device and are determined based on metadata associated with the each file or piece of content, and wherein at least one of the commands includes a command for arranging a physical item to adjust an ambience of a household of a user;
   providing the message for output to an electromechanical device that physical interacts with the set of physical items that physically interacts with the physical items based on the instruction in the message, comprising transmitting, to the electromechanical device, the command for the electromechanical device to rearrange the physical item or the one or more other physical items from the different arrangement to the predefined arrangement;
   after transmitting the command to the electromechanical device, obtaining, using the camera, a second image of the physical item arranged in the predefined arrangement among the one or more other physical items and, in response, retrieving the item of media content for output; and
   providing the item of media content for output.

2. The method of claim 1, wherein the electromechanical device comprises a 3D printer.

3. The method of claim 1, wherein the electromechanical device comprises an event log and display system having multiple timeline cords.

4. The method of claim 1, wherein the predefined arrangement comprises a chronological order, and the different arrangement comprises an other-than-chronological order.

5. The method of claim 1, wherein the item of media content was initially generated within a predetermined period of time of an owner of the physical item acquiring the physical item.

6. The method of claim 1, wherein the item of media content is registered by an owner of the physical item as being associated with the physical item only when the physical item is arranged in the predefined arrangement among the one or more other physical items.

7. The method of claim 1, wherein the predefined arrangement comprises a geographical order, and the different arrangement comprises an other-than-geographical order.

8. A system comprising:
   one or more computers and one or more storage devices storing instructions that are operable, when executed by the one or more computers, to cause the one or more computers to perform operations comprising:
   storing multiple sets of content that each (i) include content having been captured within a different context and (ii) correspond to a different physical item in a set of physical items, wherein the set of physical items are spatially arranged in positions that are associated with the different contexts within which the multiple sets of content were captured, comprising storing an item of media content that is retrieved, for output, when an image of a particular physical item arranged in a predefined arrangement among one or more other physical items of the set is obtained;
   obtaining, using a camera, a first image of the physical item arranged in a different arrangement among the one or more other physical items;
   determining each of the positions in which one or more physical items in the set of physical items are spatially arranged, comprising determining, based on the first image of the physical item arranged in the different arrangement among the one or more other physical items, a difference between the different arrangement and the predefined arrangement;
   generating a command to spatially arrange the one or more physical items in each of the one or more determined positions, comprising generating a command for an electromechanical device to rearrange the physical item or the one or more other physical items from the different arrangement to the predefined arrangement based at least on the difference, wherein commands associated with each file or piece of content are maintained by a computing device and are determined based on metadata associated with the each file or piece of content, and wherein at least one of the commands includes a command for arranging a physical item to adjust an ambience of a household of a user;
   providing the message for output to an electromechanical device that physical interacts with the set of physical items that physically interacts with the physical items based on the instruction in the message, comprising transmitting, to the electromechanical device, the command for the electromechanical device to rearrange the physical item or the one or more other physical items from the different arrangement to the predefined arrangement;

after transmitting the command to the electromechanical device, obtaining, using the camera, a second image of the physical item arranged in the predefined arrangement among the one or more other physical items and, in response, retrieving the item of media content for output; and providing the item of media content for output.

9. The system of claim 8, wherein the electromechanical device comprises a 3D printer.

10. The system of claim 8, wherein the electromechanical device comprises an event log and display system having multiple timeline cords.

11. The system of claim 8, wherein the predefined arrangement comprises a chronological order, and the different arrangement comprises an other-than-chronological order.

12. The system of claim 8, wherein the item of media content was initially generated within a predetermined period of time of an owner of the physical item acquiring the physical item.

13. The system of claim 8, wherein the item of media content is registered by an owner of the physical item as being associated with the physical item only when the physical item is arranged in the predefined arrangement among the one or more other physical items.

14. The system of claim 8, wherein the predefined arrangement comprises a geographical order, and the different arrangement comprises an other-than-geographical order.

15. A non-transitory computer readable medium having stored therein instructions, that when executed by a computing system, cause the computing system to perform functions comprising:

storing multiple sets of content that each (i) include content having been captured within a different context and (ii) correspond to a different physical item in a set of physical items, wherein the set of physical items are spatially arranged in positions that are associated with the different contexts within which the multiple sets of content were captured, comprising storing an item of media content that is retrieved, for output, when an image of a particular physical item arranged in a predefined arrangement among one or more other physical items of the set is obtained;

obtaining, using a camera, a first image of the physical item arranged in a different arrangement among the one or more other physical items;

determining each of the positions in which one or more physical items in the set of physical items are spatially arranged, comprising determining, based on the first image of the physical item arranged in the different arrangement among the one or more other physical items, a difference between the different arrangement and the predefined arrangement;

generating a command to spatially arrange the one or more physical items in each of the one or more determined positions, comprising generating a command for an electromechanical device to rearrange the physical item or the one or more other physical items from the different arrangement to the predefined arrangement based at least on the difference, wherein commands associated with each file or piece of content are maintained by a computing device and are determined based on metadata associated with the each file or piece of content, and wherein at least one of the commands includes a command for arranging a physical item to adjust an ambience of a household of a user;

providing the message for output to an electromechanical device that physical interacts with the set of physical items that physically interacts with the physical items based on the instruction in the message, comprising transmitting, to the electromechanical device, the command for the electromechanical device to rearrange the physical item or the one or more other physical items from the different arrangement to the predefined arrangement;

after transmitting the command to the electromechanical device, obtaining, using the camera, a second image of the physical item arranged in the predefined arrangement among the one or more other physical items and, in response, retrieving the item of media content for output; and providing the item of media content for output.

16. The medium of claim 15, wherein the electromechanical device comprises a 3D printer.

17. The medium of claim 15, wherein the electromechanical device comprises an event log and display system having multiple timeline cords.

18. The medium of claim 15, wherein the predefined arrangement comprises a chronological order, and the different arrangement comprises an other-than-chronological order.

19. The medium of claim 15, wherein the item of media content was initially generated within a predetermined period of time of an owner of the physical item acquiring the physical item.

20. The medium of claim 15, wherein the item of media content is registered by an owner of the physical item as being associated with the physical item only when the physical item is arranged in the predefined arrangement among the one or more other physical items.

\* \* \* \* \*